US012756507B2

(12) United States Patent
Li et al.

(10) Patent No.: US 12,756,507 B2
(45) Date of Patent: Oct. 6, 2026

(54) ENHANCED FREQUENCY HOPPING FOR DATA TRANSMISSIONS

(71) Applicant: Intel Corporation, Santa Clara, CA (US)

(72) Inventors: Yingyang Li, Beijing (CN); Gang Xiong, Portland, OR (US); Daewon Lee, Portland, OR (US); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 340 days.

(21) Appl. No.: 18/548,305

(22) PCT Filed: Mar. 9, 2022

(86) PCT No.: PCT/US2022/019613
§ 371 (c)(1),
(2) Date: Aug. 29, 2023

(87) PCT Pub. No.: WO2022/192444
PCT Pub. Date: Sep. 15, 2022

(65) Prior Publication Data

US 2024/0146473 A1 May 2, 2024

Related U.S. Application Data

(60) Provisional application No. 63/160,583, filed on Mar. 12, 2021, provisional application No. 63/161,334, filed on Mar. 15, 2021.

(51) Int. Cl.
*H04L 5/00* (2006.01)

(52) U.S. Cl.
CPC .......... *H04L 5/0012* (2013.01); *H04L 5/0044* (2013.01); *H04L 5/0091* (2013.01)

(58) Field of Classification Search
CPC ....... H04L 1/08; H04L 5/0012; H04L 5/0044; H04L 5/0051; H04L 5/0091
See application file for complete search history.

(56) References Cited

U.S. PATENT DOCUMENTS 11,432,369 B2 * 8/2022 Xiong .................. H04L 5/0051
2020/0044781 A1 2/2020 Rudolf et al.
(Continued)

FOREIGN PATENT DOCUMENTS

JP 2020108103 7/2020
KR 20190141167 A 12/2019
(Continued)

OTHER PUBLICATIONS

International Patent Office—International Search Report and Written Opinion mailed Jun. 10, 2022 from International Patent Application No. PCT/US2022/019613, 10 pages.
(Continued)

*Primary Examiner* — Mansour Oveissi
(74) *Attorney, Agent, or Firm* — Schwegman Lundberg & Woessner, P.A.

(57) ABSTRACT

Various embodiments herein are directed to enhanced frequency hopping for data transmissions, such as transmissions above a 52.6 GHz carrier frequency. Other embodiments may be disclosed or claimed. In some embodiments, a gNB may encode configuration information for operation above 52.6 GHz that includes a number of transport blocks (TBs) for frequency hopping for a data transmission associated with a user equipment (UE). The configuration information may indicate that frequency hopping for the data transmission is to be performed within the TB group based on a number of symbols for a hopping boundary. The configuration information may also indicate a first part of a TB is to be transmitted in a first hop and a second part of the
(Continued)

TB is to be transmitted in a second hop based on the number of symbols for the hopping boundary.

12 Claims, 17 Drawing Sheets

(56) References Cited

U.S. PATENT DOCUMENTS

| | | | | |
|---|---|---|---|---|
| 2022/0086870 | A1* | 3/2022 | Hu | H04L 1/08 |
| 2022/0393793 | A1* | 12/2022 | Mu | H04B 1/713 |
| 2023/0179348 | A1* | 6/2023 | Seok | H04L 5/0012 370/280 |
| 2023/0291523 | A1* | 9/2023 | Hasegawa | H04W 52/281 |

FOREIGN PATENT DOCUMENTS

| | | |
|---|---|---|
| WO | 2019049283 | 3/2019 |
| WO | 2021016818 | 2/2021 |
| WO | WO-2022192444 A1 | 9/2022 |

OTHER PUBLICATIONS

Ericsson, "Feature lead summary for Scheduling of multiple DL/UL transport blocks for LTE-MTC," 3GPP TSG-RAN WG1 Meeting #96bis, R1-1905534, Agenda Item: 6.2.1.3, Apr. 8-12, 2019, Xi'an, China, 18 pages.

Ericsson, "Feature lead summary #2 for Multi-TB scheduling for LTE-MTC," 3GPP TSG-RAN WG1 Meeting #101-e, R1-2004729, Agenda Item: 6.2.1.3, May 25-Jun. 5, 2020, e-Meeting, 10 pages.

Huawei et al., "Corrections on scheduling of multiple transport blocks," 3GPP TSG RAN WG1 Meeting #100-e, R1-2000220, Agenda Item: 6.2.1.3, Feb. 24-Mar. 6, 2020, 9 pages.

"Feature lead summary #2 for Multi-TB scheduling for LTE-MTC", Moderator (Ericsson). R1-2004729 3GPP TSG-RANWG1 #101-e, (Jun. 2, 2020), 10 pgs.

"Feature lead summary for Scheduling of multiple DL!UL transport blocks for LTE-MTC", Ericsson. R1-1905534 3GPP TSG-RAN WG1 #96bis. Xi"an. China., (Apr. 9, 2019), 19 pgs.

"International Application Serial No. PCT/US2022/019613, International Preliminary Report on Patentability mailed Sep. 21, 2023", 6 pgs.

"International Application Serial No. PCT/US2022/019613, International Search Report mailed Jun. 10, 2023", 4 pgs.

"International Application Serial No. PCT/US2022/019613, Written Opinion mailed Jun. 10, 2022", 4 pgs.

Huawei, et al., "Corrections on scheduling of multiple transport blocks", R1-2000220. 3GPP TSG-RAN WG1 #100-e, (Feb. 15, 2020), 8 pgs.

"Japanese Application Serial No. 2023-555505, Notification of Reasons for Refusal mailed Feb. 3, 2026", w English translation, 4 pgs.

Intel, Corporation, "Discussion on TB processing over multi-slot PUSCH", 3GPP TSG RAN WG1 #104~e RI-2100666, Jan. 19, 2021, 6 pgs.

* cited by examiner

ENHANCED FREQUENCY HOPPING FOR DATA TRANSMISSIONS

CROSS REFERENCE TO RELATED APPLICATIONS

The present application is a national phase entry under 35 U.S.C. § 371 of International Application No. PCT/US2022/019613, filed Mar. 9, 2022, entitled "ENHANCED FREQUENCY HOPPING FOR DATA TRANSMISSIONS," which claims priority to U.S. Provisional Patent Application No. 63/160,583, which was filed Mar. 12, 2021; and to U.S. Provisional Patent Application No. 63/161,334, which was filed Mar. 15, 2021, the entire disclosures of which are hereby incorporated by reference.

FIELD

Various embodiments generally may relate to the field of wireless communications. For example, some embodiments may relate to enhanced frequency hopping for data transmissions, such as transmissions above a 52.6 GHz carrier frequency.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich content and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

The NR system operates based on a concept of slot. A physical downlink shared channel (PDSCH) or a physical uplink shared channel (PUSCH) is restricted within a slot. Such restriction on PDSCH or PUSCH may still applies in high frequency. On the other hand, for a system operating above 52.6 GHz carrier frequency, especially for Terahertz communication, it is envisioned that a larger subcarrier spacing is needed to combat severe phase noise. In case when a larger subcarrier spacing, e.g., 1.92 MHz or 3.84 MHz is employed, the slot duration can be very short. For instance, for 1.92 MHz subcarrier spacing, one slot duration is approximately 7.8 μs. This extremely short slot duration may not be sufficient for higher layer processing, including Medium Access Layer (MAC) and Radio Link Control (RLC), etc. In order to address this issue, gNB may schedule the DL or UL data transmission across slot boundary with long transmission duration. In other words, slot concept may not be needed when scheduling data transmission.

Figure 1:
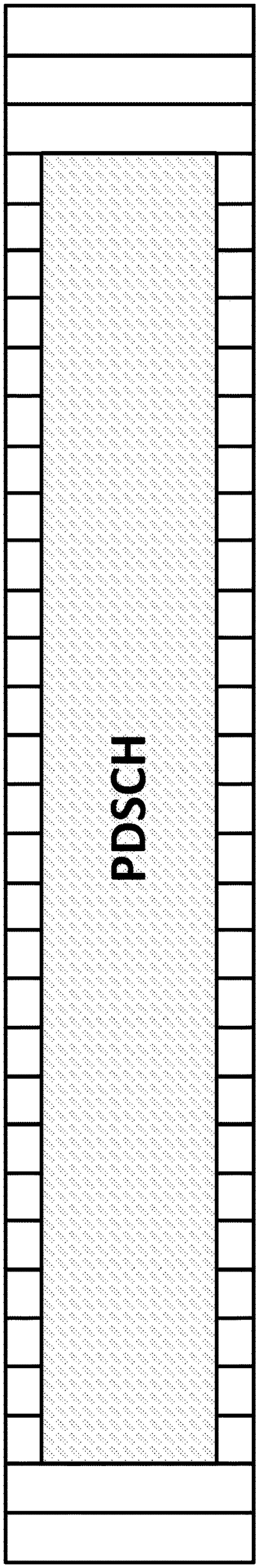
FIG. 1 illustrates an example of a Long PDSCH transmission duration in accordance with various embodiments.
Figure 2:
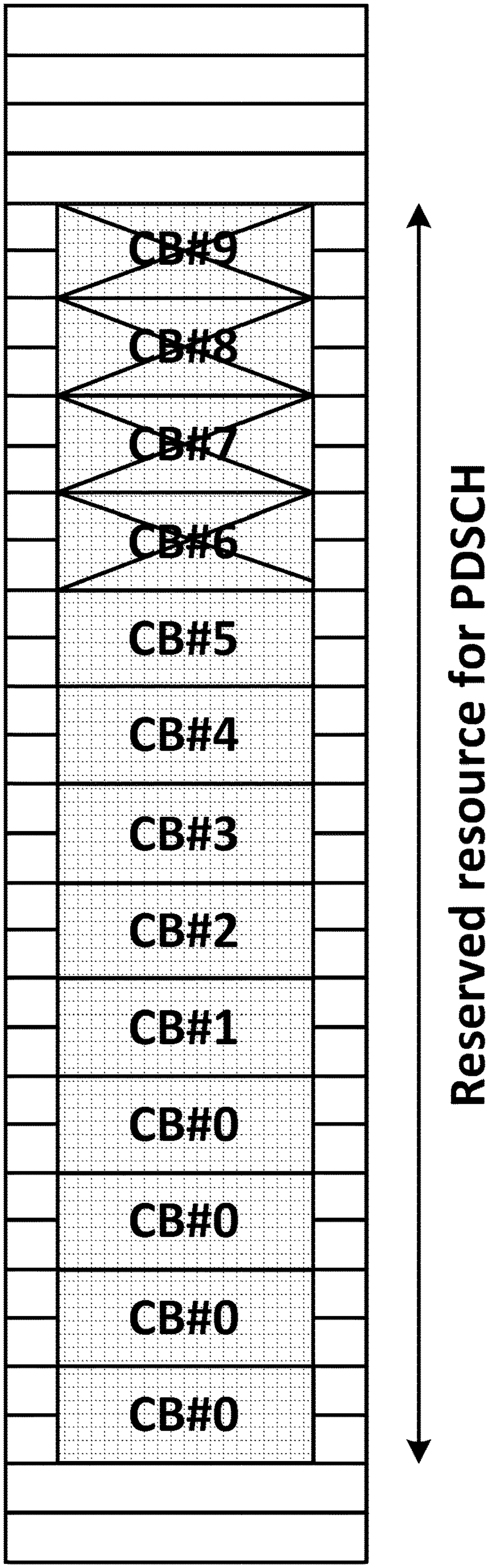
FIG. 2 illustrates an example of an early termination of a PDSCH transmission in accordance with various embodiments.

FIG. 1 illustrates one example of long PDSCH transmission duration. In a DL transmission, more DL traffic may arrive at the gNB when the gNB already sends out a DL downlink control information (DCI) or a previous PDSCH transmission is still ongoing. The gNB has to send a new DL DCI to schedule a PDSCH which results in the delay of data transmissions. One solution could be to allow a gNB to schedule more DL resources than that required to transmit the current DL data in the buffer. Consequently, if new DL traffic arrives, gNB can continue the PDSCH transmission for the new DL traffic on the scheduled DL resource. On the other hand, if there is no new incoming DL traffic, the scheduled DL resources needs to be released earlier, e.g. early termination of the PDSCH transmission. In fact, besides the case of lacking new DL traffic, there may also exist other reasons that gNB needs to terminate a DL transmission earlier. FIG. 2 illustrates an example for which the allocated DL resources could carry 10 CBs. However, the DL transmission may be terminated only after the transmission of 6 CBs.

For the hybrid automatic repeat request (HARQ) based data transmission with long duration, the number of transport blocks (TB) is also increased correspondingly for efficient HARQ retransmission. Further, gNB needs to have the flexibility to control the number of TBs in the scheduled data transmission by a DCI. Embodiments herein provide solutions for efficient indication of the scheduling information in the DCI.

Various embodiments herein include techniques to schedule multiple transport block transmissions for above 52.6 GHz carrier frequency.

In the following descriptions, a downlink or uplink data transmission scheduled by a DCI consists of M transport blocks (TB) or TB groups. M may be ranged from 1 to $M_{max}$. $M_{max}$ is the maximum number of scheduled TBs or TB groups by the DCI. Each TB consists of one or multiple consecutive code block (CB)s. CRC is added for each CB respectively. A TB may correspond to a MAC PDU. A separate HARQ process number (HPN) may be assigned to each TB. A TB could be mapped to all time/frequency resources of L consecutive data symbols. For example, L equals to 1. By this way, symbol alignment is achieved for a TB.

Figure 3:
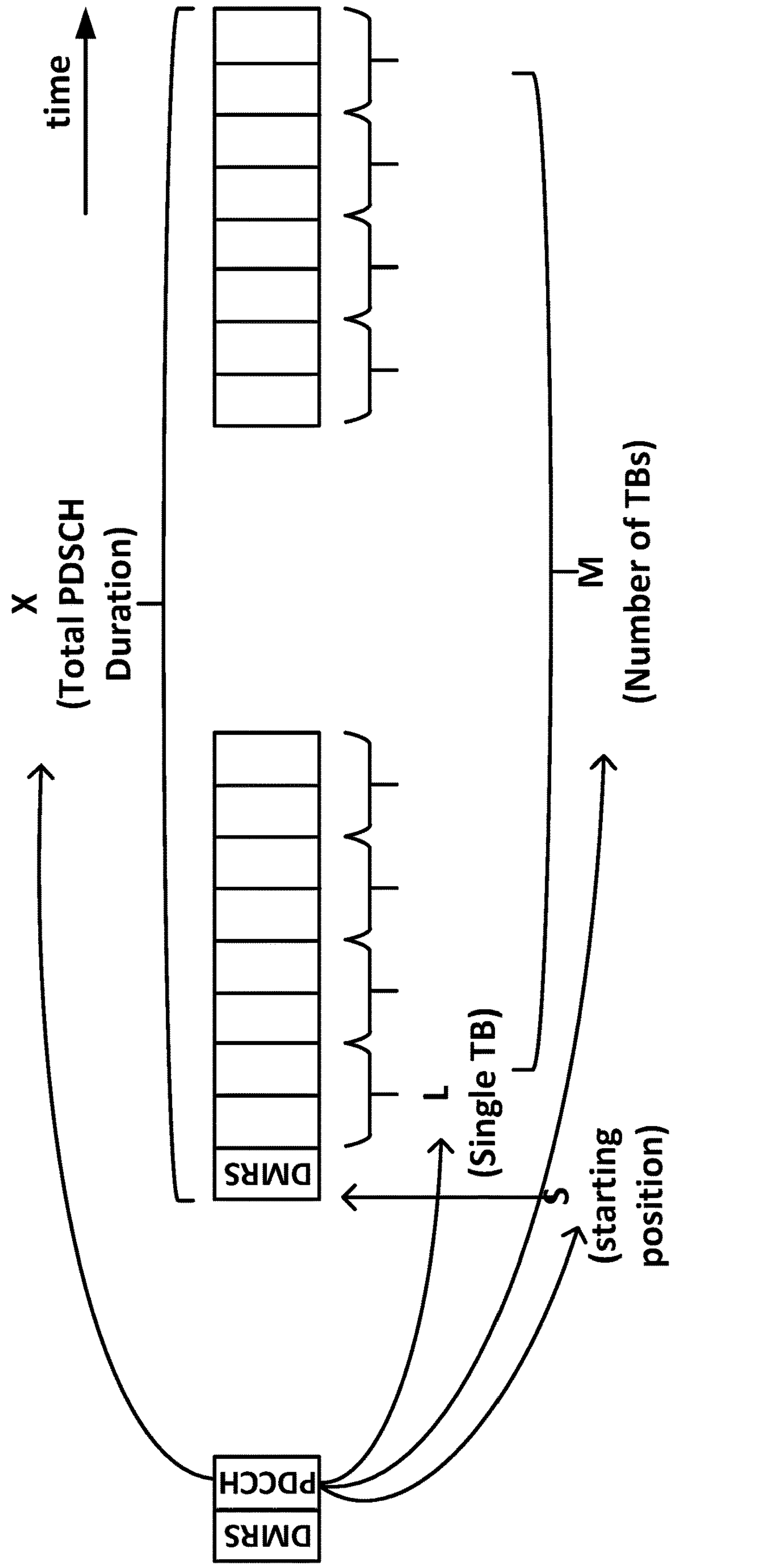
FIG. 3 illustrates an example of components of a PDSCH transmission and required signaling in accordance with various embodiments.

To schedule a DL or UL transmission by a DCI, the DCI needs to indicate the start symbol (S) of the allocated time resource, the number of symbols for a TB or a TB group (L), the total number of symbols (X) of the allocated time resource or the number of scheduled TBs or TB groups (M). FIG. 3 shows an example of the allocated time resource which carries M TBs. The value of start symbol S may be defined by an offset relative to the last symbol of the PDCCH carrying the DCI. Alternatively, the start symbol S may be defined by the start symbol index in a slot. In the latter case, the number of slots of the scheduling delay from the PDCCH to the allocated time resource, e.g. K0 in NR needs to be indicated in the DCI. Further, the DCI includes a field to differentiate new transmission or retransmission for each of the M scheduled TBs or TB groups. In the following descriptions, this field is named as new transmission or retransmission indication (NRI). If early termination is enabled, less than M TBs or TB groups may be transmitted. UE can simply ignore the NRI after early termination.

The above information S, L, X or M, and NRI can be indicated by separate fields in a DCI. A drawback is the overhead in the DCI may be increased. Therefore, it is necessary to do joint coding for some or all of the information to reduce the overhead. On the other hand, flexibility for gNB scheduling and the simplicity for the configuration should also be considered.

TDRA Field to Indicate the Number of Scheduled TBs or TB Groups

In one embodiment, the time domain resource allocation (TDRA) field in the DCI can indicate the number of scheduled TBs or TB groups, e.g. M, where a number of TBs in a TB group can be configured by higher layers via RRC signalling. A TDRA table may be configured by high layer. Each entry of the TDRA table may have same or different information M. The total number of symbols in the allocated time resource can be calculated, e.g. X=L·M+R. R is the number of DMRS symbols in the allocated time resource which can be derived by L, M or X. The size of NRI field can be determined by the maximum of value M among all entries of the TDRA table.

In one option, each entry of TDRA field indicates the information S, L, M for the allocated data transmission. On the other hand, the information NRI is indicated by separate field in the DCI.

In another option, each entry of TDRA field indicate S, M for the allocated data transmission. On the other hand, L and NRI can be respectively indicated by separate fields in the DCI.

In one embodiment, the time domain resource allocation (TDRA) field in the DCI can indicate the total number of symbols for the allocated time resource, e.g. X. A TDRA table may be configured by high layer. Each entry of the TDRA table may have same or different information X. The total number of scheduled TBs can be calculated, e.g. M=(X−R)/L. R is the number of DMRS symbols in the allocated time resource which can be derived by X. The size of NRI field can be determined by the maximum of value M among all entries of the TDRA table.

In another option, each entry of TDRA field indicates the information S, L, X for the allocated data transmission. On the other hand, the information NRI is indicated by separate field in the DCI.

In another option, each entry of TDRA field indicate S, X for the allocated data transmission. On the other hand, L and NRI can be respectively indicated by separate fields in the DCI.

NRI Field to Indicate the Number of Scheduled TBs or TB Groups

The NRI field in the DCI can indicate the number of scheduled TBs or TB groups, e.g. M, where a number of TBs in a TB group can be configured by higher layers via RRC signaling, and differentiate each of the M TBs or TB groups as a new transmission or retransmission. The size of NRI field can be configured by high layer signaling. The total number of symbols in the allocated time resource can be calculated, e.g. X=L·M+R. R is the number of DMRS symbols in the allocated time resource which can be derived by L, M or X. Note that one HARQ-ACK bit may be reported for a TB or a TB group.

Each entry of TDRA field indicate the information S, L for the allocated data transmission. On the other hand, the information NRI is indicated by separate field in the DCI. Since the number of scheduled TBs or TB groups is not indicated by each entry of TDRA table, it simplifies the configuration of the TDRA table. The size of TDRA table is expected to be decreased without impacting the scheduling flexibility. Alternatively, the information S, L and NRI can be respectively indicated by separate fields in the DCI.

In one embodiment, the NRI field in the DCI can be interpreted into a bitmap of length $M_{max}$ and one special bit. $M_{max}$ is the maximum number of scheduled TBs or TB groups by the DCI. Denote the number of scheduled TBs or TB groups as M, the first M bits, e.g. $b_k$, k=0, 1, . . . M−1 in the bitmap respectively indicate a corresponding TB or TB group as a new transmission or retransmission, either by indicating 0 or 1. The 'M+1'th bit, e.g. $b_M$ if existed in the bitmap which does not have a corresponding TB or TB group will be set to a value different from the 'M'th bit, e.g. $b_{M-1}$. Each of the last $M_{max}$−M bits in the bitmap, if existed, are set to same value as the 'M+1'th bit.

The NRI field can be directly configured to include a bitmap of length $M_{max}$ and one special bit.

Alternatively, the NRI field can be directly configured as a bitmap of length $M_{max}+1$. The last bit serves as the special bit.

Alternatively, $M_{max}$ may be explicitly indicated in the DCI.

Alternatively, the NRI field can be configured to include a sub-field of less than $M_{max}$ bits and one special bit. The sub-field can be interpreted into $M_{max}$ bits, so that it can differentiate new transmission or retransmission for up to $M_{max}$ TBs or TB groups. For example, the sub-field may indicate a group of consecutive TBs that are all new transmissions or all retransmission. In this case, a start TB index and number of TBs in the group can be used for the indication.

In one option, the special bit is set to a value that is different from the 'M'th bit, e.g. $b_{M-1}$ in the bitmap. Accordingly, UE considers the TBs or TB groups corresponding to the last $M_{max}$−M bits in the bitmap, if existed, that have the same value as the special bit to not have been scheduled. The last bit within the bitmap to have a different value compared to the special bit indicates the last scheduled TB or TB group.

Figure 4:
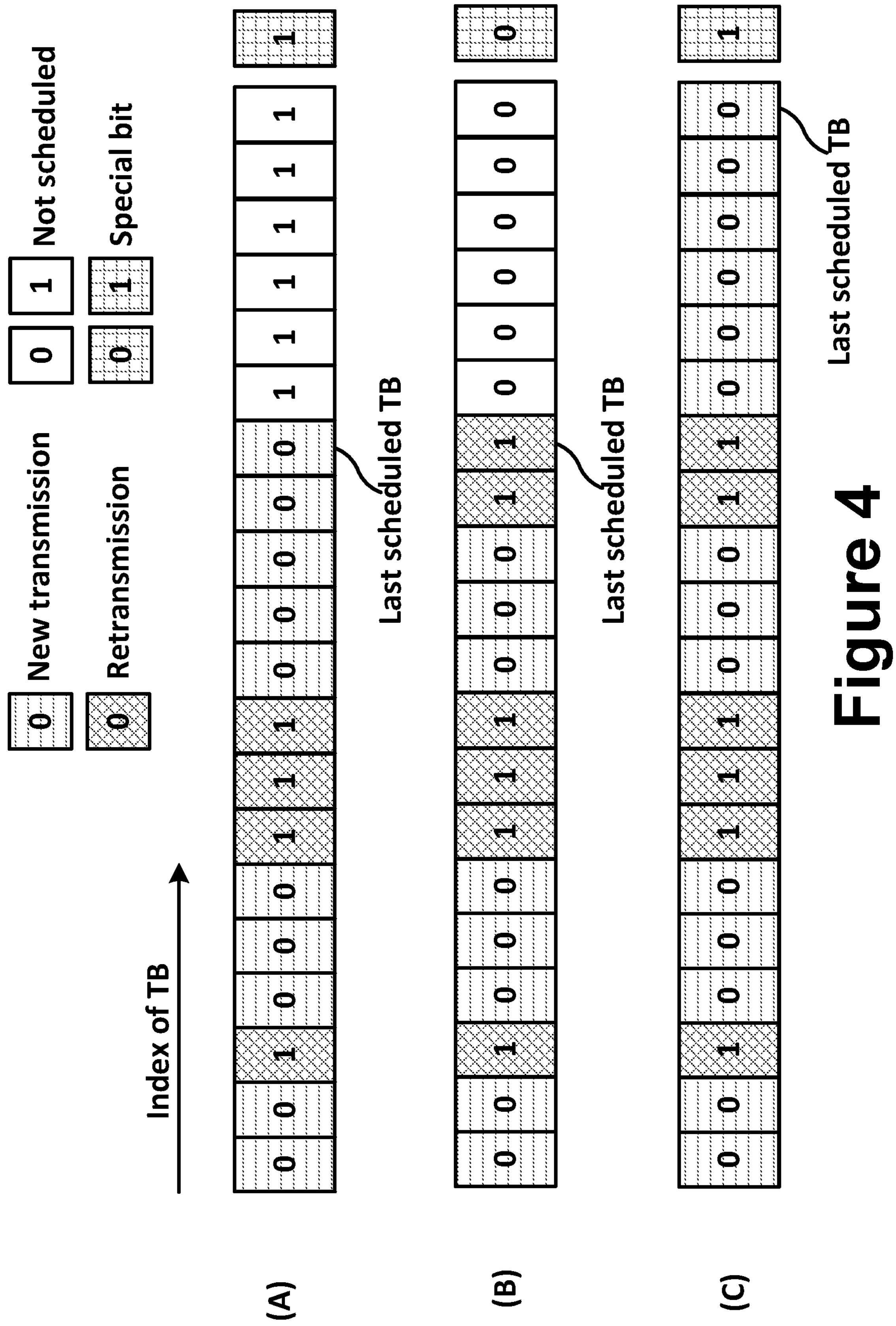
FIG. 4 illustrates an example of an indication of a number of scheduled TBs and differentiation of new transmissions or retransmissions in accordance with various embodiments.

FIG. 4 illustrates the scheme to indicate the number of the scheduled TBs (M) based on a bitmap of $M_{max}$=20 bits and a special bit. The new transmission or retransmission is indicated by value '0' and '1' respectively. In FIG. 4A, since the last scheduled TB is for new transmission, all remaining bits in the bitmap are set to '1'. The special bit is set to '1'. UE considers TBs that are associated with the last bits in the bitmap having same value as the special bit, e.g. '1' are not scheduled. As a comparison, in FIG. 4B, if the last scheduled TB is for retransmission, all remaining bits in the bitmap are set to '0'. The special bit is set to '0' too. In an extreme case, assuming $M_{max}$=20 TBs are scheduled by the DCI, all 20 bits in the bitmap are useful. In this case, the special bit is set to a different value from the last bit of the bitmap. As shown in FIG. 4C, since the last TB is a new transmission, the special bit can be set to '1'.

In another option, the special bit indicates whether the last bits in the bitmap that have the same value are valid to indicate schedule TBs or TB groups or not. For example, value '0' or '1' respectively means the last bits are valid or not valid. Accordingly, if the special bit is '1', UE considers that the TBs or TB groups corresponding to the last $M_{max}$−M bits in the bitmap that have the same value to not have been scheduled. The last bit within the bitmap that has a different value compared to the last bit of the bitmap indicates the last scheduled TB or TB group. On the other hand, if the special bit is '0', UE considers all bits in the bitmap indicate scheduled TB or TB groups.

Figure 5:
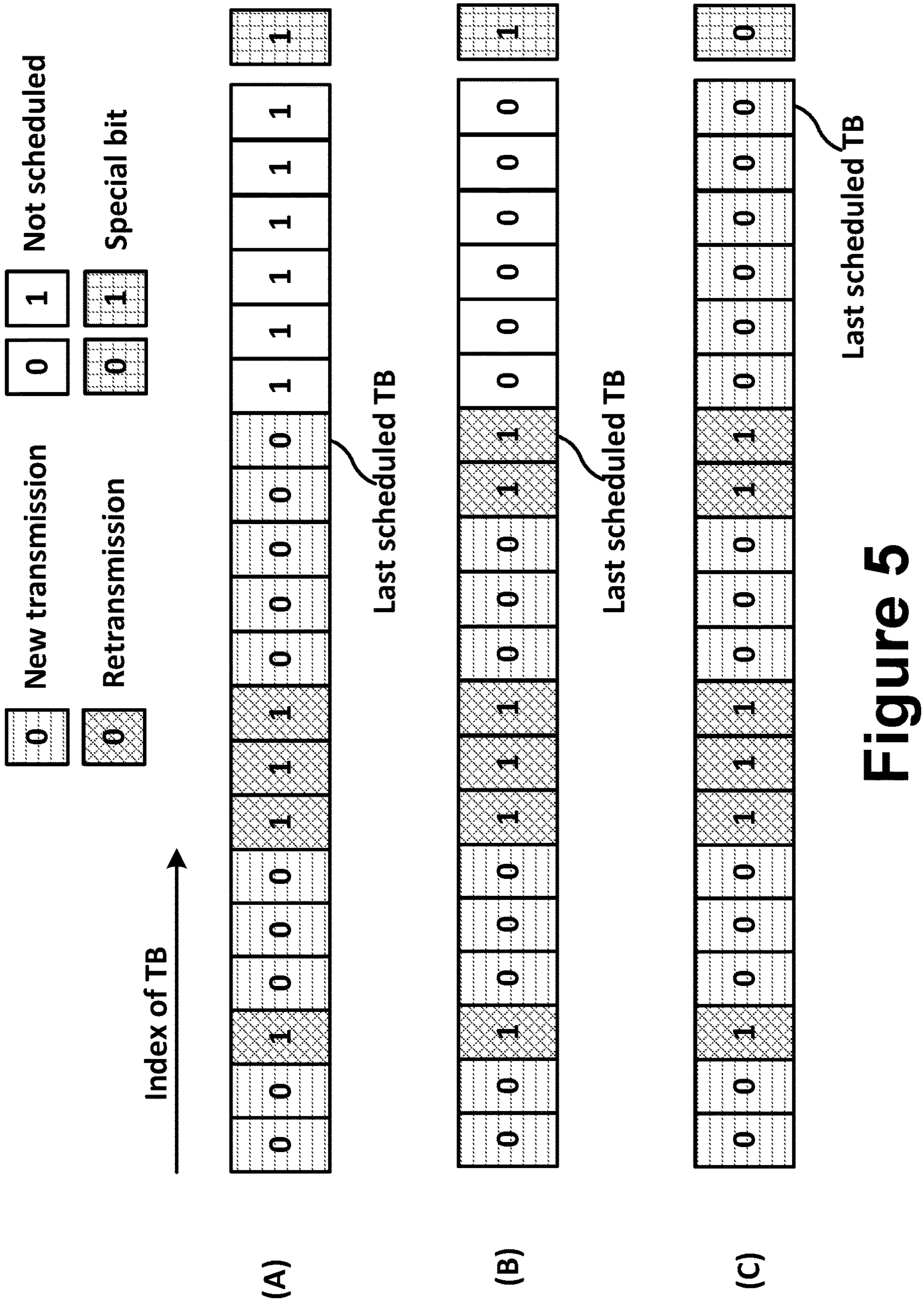
FIG. 5 illustrates an example of an indication of a number of scheduled TBs and differentiation of new transmissions or retransmissions in accordance with various embodiments.

FIG. 5 illustrates the scheme to indicate the number of the scheduled TBs (M) based on a bitmap of $M_{max}$=20 bits and a special bit as validation indication. The new transmission or retransmission is indicated by value '0' and '1' respectively. In FIG. 5A, since the last scheduled TB is for new transmission, all remaining bits in the bitmap are set to '1'. The special bit is set to '1' to indicate the last consecutive '1' in the bitmap are not valid to indicate scheduled TBs. As a comparison, in FIG. 5B, if the last scheduled TB is for retransmission, all remaining bits in the bitmap are set to '0'. Again, the special bit is set to '1' to indicate the last consecutive '0' in the bitmap are not valid to indicate scheduled TBs. In an extreme case, assuming $M_{max}$=20 TBs are scheduled by the DCI, all 20 bits in the bitmap are useful. In this case, as shown in FIG. 5C, the special bit is set to '0' to indicate all bits in the bitmap are valid indicate scheduled TBs.

In one embodiment, the NRI field in the DCI can be interpreted into a bitmap of length $M_{max}+1$. $M_{max}$ is the maximum number of scheduled TBs or TB groups by the DCI. Denote the number of scheduled TBs as M, the first M bits, e.g. $b_k$, k=0, 1, . . . M−1 in the bitmap respectively indicate a corresponding TB or TB group as a new transmission or retransmission, either by indicating 0 or 1. The 'M+1'th bit, e.g. $b_M$ in the bitmap which does not have a corresponding TB or TB group will be set to a value different from the 'M'th bit, e.g. $b_{M-1}$. Each of the last $M_{max}+1-M$ bits in the bitmap are set to same value as the 'M+1'th bit. Accordingly, UE considers the last $M_{max}+1-M$ bits in the bitmap that have the same value as the last bit of the bitmap are not associated with scheduled TBs. The last bit within the bitmap to have a different value compared to the last bit of the bitmap indicates the last scheduled TB or TB group.

The NRI field can be directly configured as a bitmap of length $M_{max}+1$.

Alternatively, the NRI field can be configured to include a sub-field of less than $M_{max}$ bits and one special bit. The sub-field can be interpreted into $M_{max}$ bits, so that it can differentiate new transmission or retransmission for up to $M_{max}$ TBs or TB groups. For example, the sub-field may indicate a group of consecutive TBs that are all new transmissions or all retransmission. In this case, a start TB index and number of TBs in the group can be used for the indication. The $M_{max}$ bits and the special bit are combined into the bitmap of length $M_{max}+1$.

Figure 6:
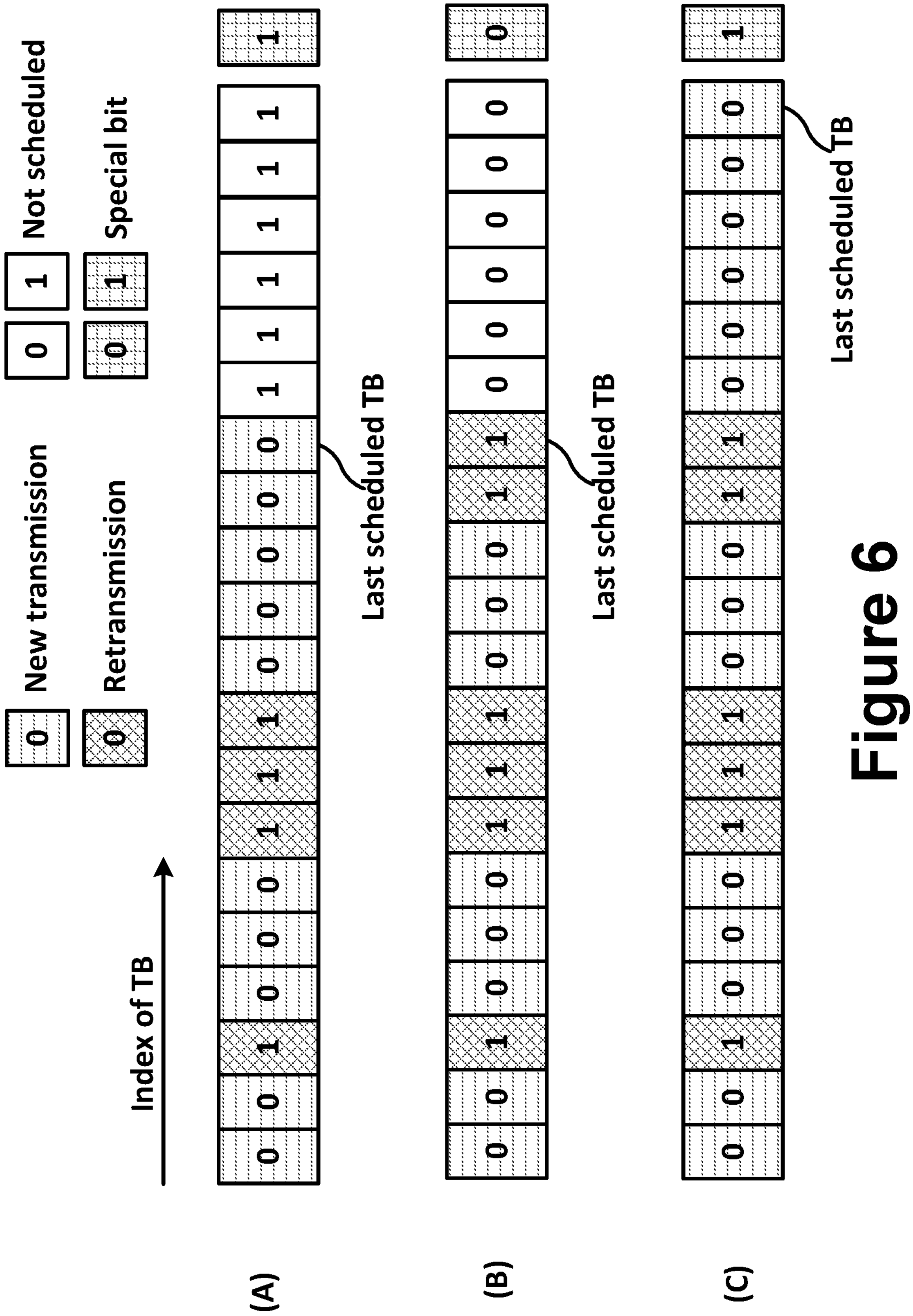
FIG. 6 illustrates an example of an indication of a number of scheduled TBs and differentiation of new transmissions or retransmissions in accordance with various embodiments.

FIG. 6 illustrates the scheme to indicate the number of the scheduled TBs (M) based on a bitmap of $M_{max}+1$=21 bits. The new transmission or retransmission is indicated by value '0' and '1' respectively. In FIG. 6A, since the last scheduled TB is for new transmission, all remaining bits in the bitmap are set to '1'. UE considers TBs that are associated with the last bits in the bitmap having same value as the last bit, e.g. '1' are not scheduled. As a comparison, in FIG. 6B, if the last scheduled TB is for retransmission, all remaining bits in the bitmap are set to '0'. In an extreme case, assuming $M_{max}$=20 TBs are scheduled by the DCI, all 20 bits in the bitmap are useful. In this case, the last bit is set to a different value from the last bit of the bitmap. As shown in FIG. 6C, since the last TB is a new transmission, the last bit can be set to '1'.

Zero Padding for NRI Field and Allowing Potential Early Termination

The NRI field in the DCI can be interpreted into a bitmap of length $M_{max}$. $M_{max}$ is the maximum number of scheduled TBs or TB groups by the DCI. Each bit in the bitmap respectively indicate a corresponding TB or TB group as a new transmission or retransmission, either by indicating 0 or 1. In this way, up to $M_{max}$ TBs or TB groups can be transmitted. However, if early termination happens, the number of transmitted TBs or TB groups can be less than $M_{max}$. The max number of symbols in the allocated time resource can be calculated, e.g. $X_{max}=L\cdot M_{max}+R$. R is the number of DMRS symbols in the allocated time resource which can be derived by L, $M_{max}$ or $X_{max}$. Note that one HARQ-ACK bit may be reported for a TB or a TB group.

The NRI field can be directly configured as a bitmap of length $M_{max}$. Alternatively, the NRI field can be configured with less than $M_{max}$ bits. The NRI field is then interpreted into $M_{max}$ bits, so that it can differentiate new transmission or retransmission for up to $M_{max}$ TBs or TB groups. For example, NRI may indicate a group of consecutive TBs that are all new transmissions or all retransmission. In this case, a start TB index and number of TBs in the group can be used for the indication Each entry of TDRA field indicate the information S, L for the allocated data transmission. On the other hand, the information NRI is indicated by separate field in the DCI. Since the number of scheduled TBs or TB groups is not indicated by each entry of TDRA table, it simplifies the configuration of the TDRA table. The size of TDRA table is expected to be decreased without impacting the scheduling flexibility. Alternatively, the information S, L and NRI can be respectively indicated by separate fields in the DCI.

Enhanced Frequency Hopping for Data Transmissions

In NR Release 15, system design is targeted for carrier frequencies up to 52.6 GHz with a waveform choice of cyclic prefix-orthogonal frequency-division multiplexing (CP-OFDM) for DL and UL, and additionally, Discrete Fourier Transform-spread-OFDM (DFT-s-OFDM) for UL. However, for carrier frequency above 52.6 GHz, it is envisioned that single carrier based waveform is needed in order to handle issues including low power amplifier (PA) efficiency and large phase noise.

For single carrier based waveform, DFT-s-OFDM can be considered for both DL and UL. For OFDM based transmission scheme including DFT-s-OFDM, a cyclic prefix (CP) is inserted at the beginning of each block, where the last data symbols in a block is repeated as the CP. Typically, the length of CP exceeds the maximum expected delay spread in order to overcome the inter-symbol interference (ISI).

Figure 7:
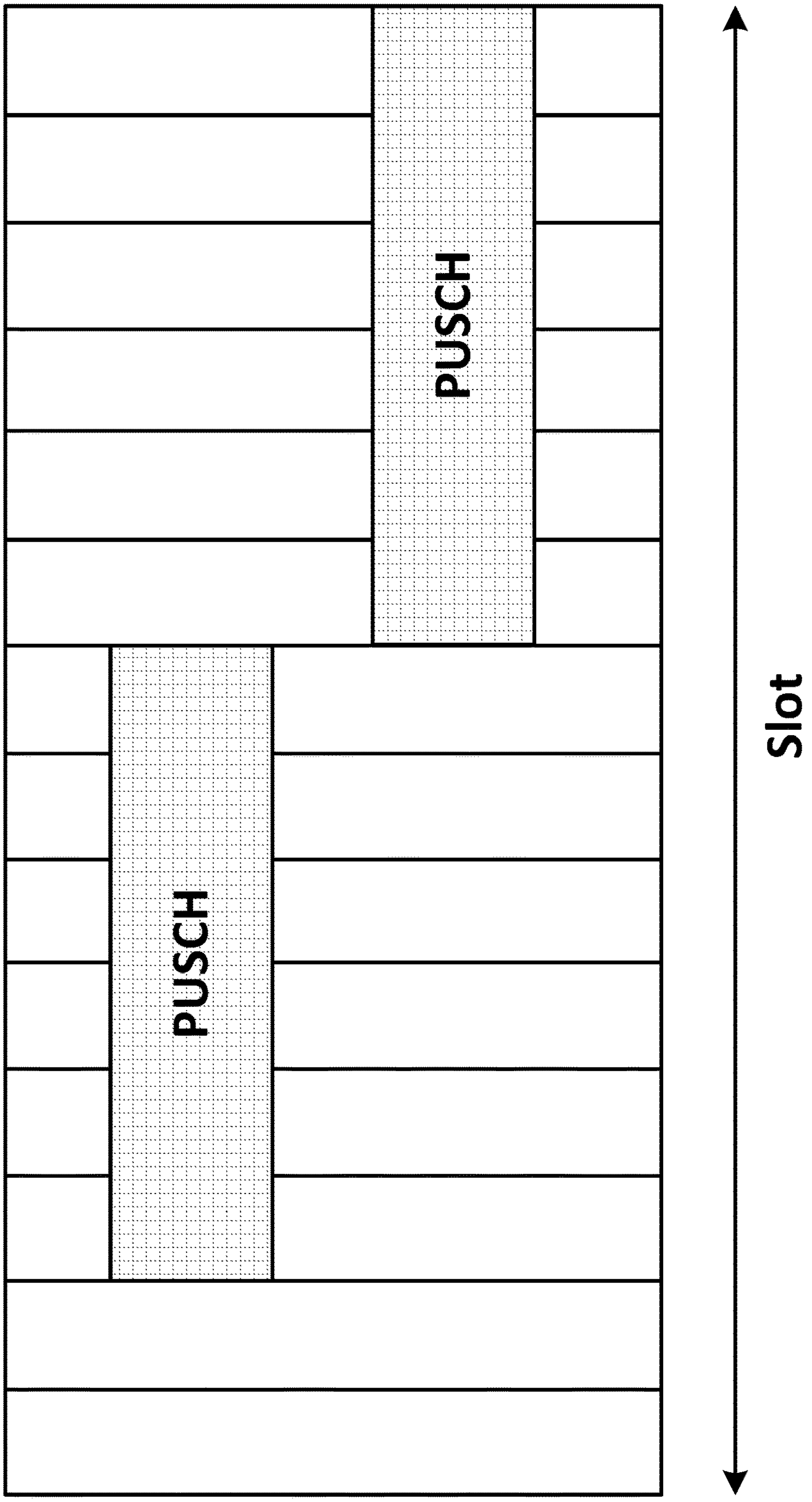
FIG. 7 illustrates an example of intra-slot frequency hopping for PUSCH in NR in accordance with various embodiments.

In NR, for physical uplink shared channel (PUSCH) without repetition, intra-slot frequency hopping can be employed to exploit the benefit of frequency diversity. For PUSCH repetition type A, inter-slot frequency hopping can also be used to improve the performance, where frequency hopping is performed every slot for PUSCH repetition. Further, for PUSCH repetition type B, inter-repetition frequency hopping can be used, where frequency hopping is performed on the basis of nominal repetition. FIG. 7 illustrates one example of intra-slot frequency hopping for PUSCH in NR. In the example shown in FIG. 7, frequency hopping is performed at the half of the duration for PUSCH transmission within a slot.

For systems operating above 52.6 GHz carrier frequency or 6G communication systems, it is envisioned that a larger subcarrier spacing is needed to combat severe phase noise. In case when a larger subcarrier spacing, e.g., 1.92 MHz or 3.84 MHz is employed, the slot duration can be very short. This extremely short slot duration may not be sufficient for higher layer processing, including Medium Access Layer (MAC) and Radio Link Control (RLC), etc. To address this issue, gNB may schedule the DL or UL data transmission across slot boundary, which may indicate that the concept of slot may not be necessary.

Further, it can be expected that a relatively large number of transport blocks (TB) may be scheduled by a single downlink control information (DCI) for physical downlink shared channel (PDSCH) and physical uplink shared channel (PUSCH) for high data throughput. In this case, certain enhancements on frequency hopping may need to be considered for the transmission of PDSCH or PUSCH to exploit the benefit of frequency diversity.

Various embodiments herein provide enhanced frequency hopping mechanisms for system operating at higher carrier frequency.

Enhanced Frequency Hopping Mechanism

As mentioned above, for system operating above 52.6 GHz carrier frequency or 6G communication system, it is envisioned that a larger subcarrier spacing is needed to combat severe phase noise. In case when a larger subcarrier spacing, e.g., 1.92 MHz or 3.84 MHz is employed, the slot duration can be very short. This extremely short slot duration may not be sufficient for higher layer processing, including Medium Access Layer (MAC) and Radio Link Control (RLC), etc. To address this issue, gNB may schedule the DL or UL data transmission across slot boundary, which may indicate that the concept of slot may not be necessary.

Further, it can be expected that a relatively large number of transport blocks (TB) may be scheduled by a single downlink control information (DCI) for physical downlink shared channel (PDSCH) and physical uplink shared channel (PUSCH) for high data throughput. In this case, certain enhancements on the frequency hopping may need to be considered for PDSCH or PUSCH to exploit the benefit of frequency diversity.

Embodiments of enhanced frequency hopping mechanisms are provided as follows:

In one embodiment, a number of transport blocks (TB) can be grouped into a TB group. Further, frequency hopping is performed within the TB group. In particular, the number of TBs in the TB group can be configured by higher layers via minimum system information (MSI), remaining minimum system information (RMSI), other system information (OSI) or dedicated radio resource control (RRC) signalling or dynamically indicated in the downlink control information (DCI) or a combination thereof.

To enable frequency hopping, a first part of a TB is transmitted in a first hop and a second part of the TB is transmitted in a second hop. In this case, mapping order of a TB can be defined in a time first and frequency second manner. More specifically, a TB is first mapped into time domain and then frequency domain in the allocated resource.

In addition, dedicated DMRS symbols are allocated in each hop before the transmitted of a first TB within the TB group or a whole hopping boundary where UE one frequency hopping. In case when a relatively large number of symbols is allocated in each hop, additional DMRS symbols may be allocated in the middle of the TBs in each hop.

Figure 8:
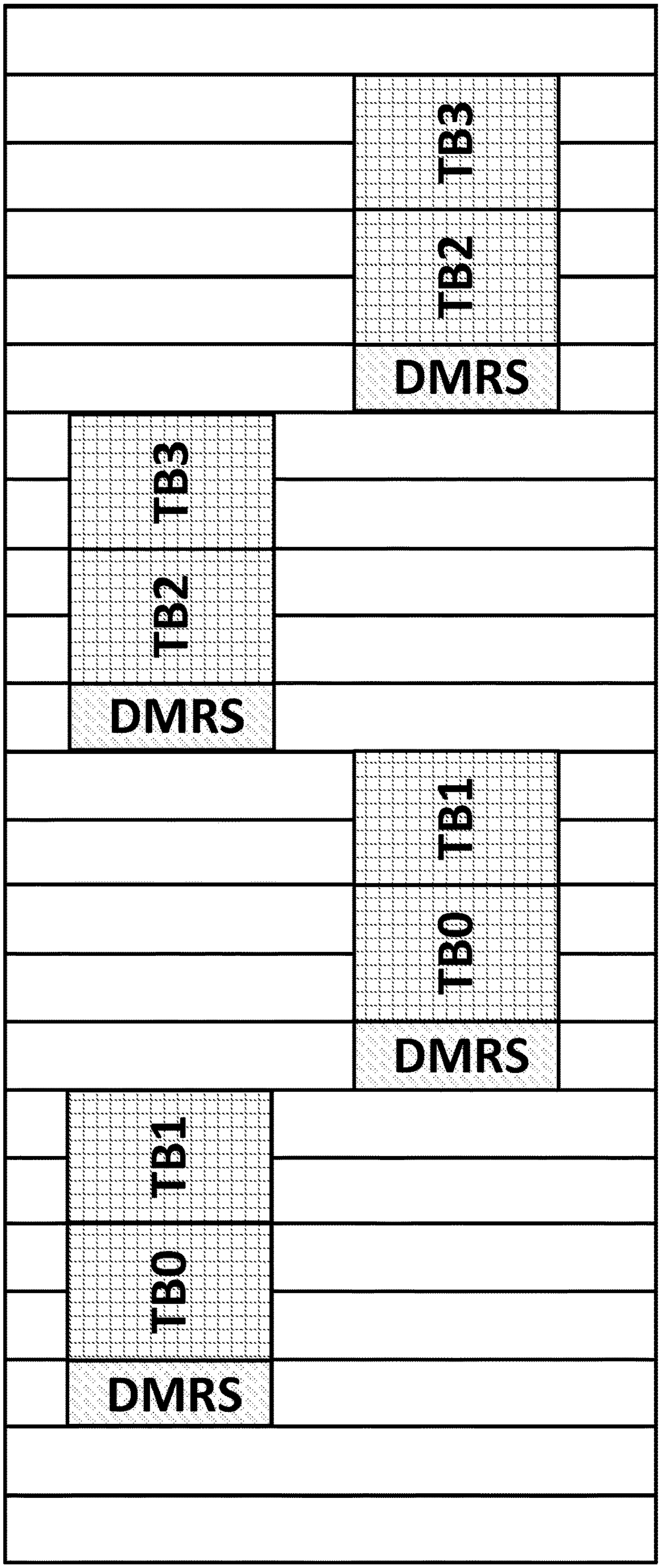
FIG. 8 illustrates an example of frequency hopping on the unit of a TB group in accordance with various embodiments.

FIG. 8 illustrates one example of frequency hopping on the unit of a TB group. In the example, a TB spans 4 symbols. Further, the number of TBs for time domain HARQ-ACK bundling is 2. In this case, a first part of TB0 and TB1 is transmitted in a first hop and a second part of TB0 and TB1 is transmitted in a second hop. This frequency hopping pattern continues until all the TBs are allocated.

Note that depending on the number of symbols allocated for a TB, e.g., when one symbol is allocated for a TB, one or more TBs may be mixed into the same symbol when frequency hopping is applied.

Figure 9:
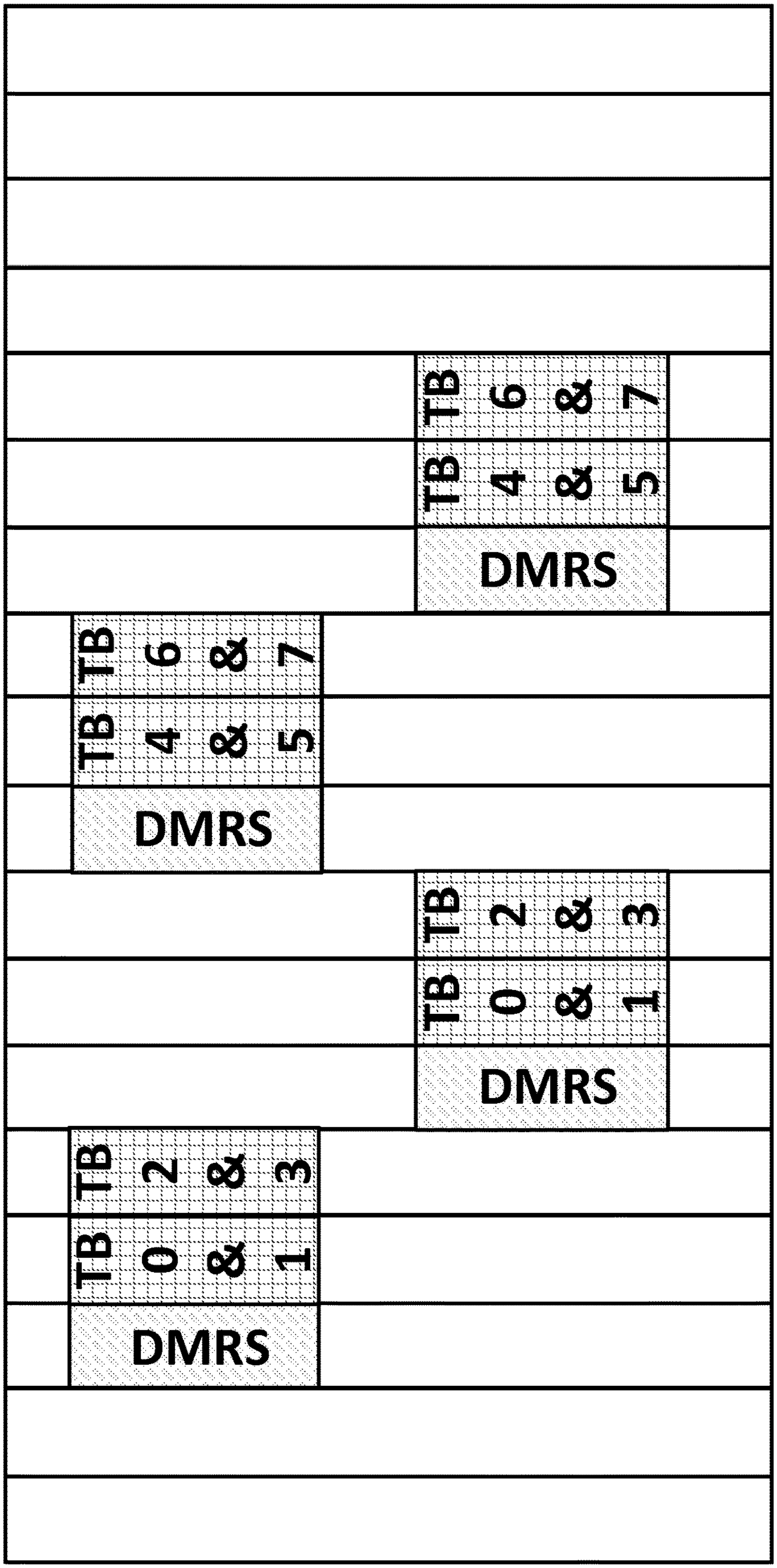
FIG. 9 illustrates an example of frequency hopping on a mixed TB in accordance with various embodiments.

FIG. 9 illustrates one example of frequency hopping on a mixed TB. In the example, the number of symbols allocated for a TB is 1 and the number of TBs for a TB group for frequency hopping is 4. In this case, a first part of TB0 and TB1 is transmitted in a first hop in a same symbol and a second part of TB0 and TB1 is transmitted in a second hop in a same symbol.

In another embodiment, to allow fast processing, transmission of a TB may be aligned with symbol boundary. In this case, frequency hopping may be performed within a number of symbols within a PDSCH or PUSCH transmission. Further, the number of symbols for the whole hopping boundary where UE performs one frequency hopping can be configured by higher layers via MSI, RMSI (SIB1), OSI or RRC signalling or dynamically indicated in the DCI or a combination thereof. Note that the configured or indicated number of symbols for a whole hopping boundary may or may not include the demodulation reference symbol (DMRS).

Similarly, dedicated DMRS symbols are allocated in each hop before the transmitted of a first TB within the TB group or a whole hopping boundary where UE one frequency hopping. In case when a relatively large number of symbols is allocated in each hop, additional DMRS symbols may be allocated in the middle of the TBs in each hop.

Figure 10:
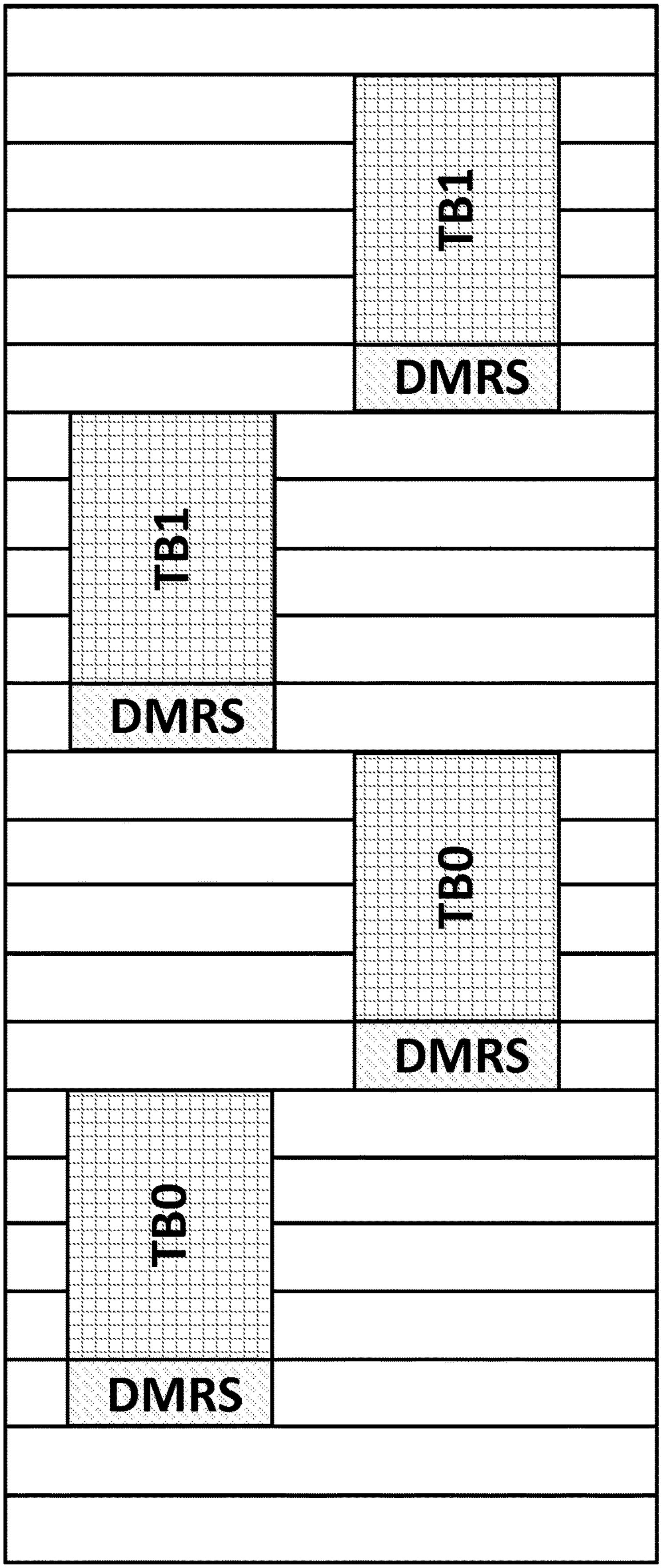
FIG. 10 illustrates an example of frequency hopping on the unit of a TB in accordance with various embodiments.

FIG. 10 illustrates one example of frequency hopping on the unit of a TB. In the example, a TB spans 8 symbols. Further, when frequency hopping is enabled, a TB is divided into two part, where the first 4 symbols are transmitted in the first hop and the second 4 symbols are transmitted in the second hop. In this case, the number of symbols for a whole hopping boundary is 8, which can be dynamically indicated in the DCI.

In another embodiment, if time domain bundling for hybrid automatic repeat request-acknowledgement (HARQ-ACK) feedback is enabled, the number of symbols for a whole hopping boundary or the number of TBs within a TB group for frequency hopping can be determined in accordance with the configured or indicated time domain bundling size for HARQ-ACK feedback.

In one example, when HARQ-ACK feedback for two TBs is bundled into a single HARQ-ACK bit, and when the number of symbols for a TB is 4 symbols, then the number of symbols for frequency hopping is 8, which may or may not include the demodulation reference symbol (DMRS).

In another embodiment, for the mixed initial transmission and retransmission in a PDSCH or PUSCH, gNB may schedule different modulation orders for initial transmission and retransmission of TBs. In this case, dedicated DMRS(s) are allocated for the initial transmission and retransmission of the TBs, respectively.

In this case, when frequency hopping is enabled, retransmission of the TBs is grouped first for frequency hopping and followed by initial transmission of the TBs on PDSCH or PUSCH.

Figure 11:
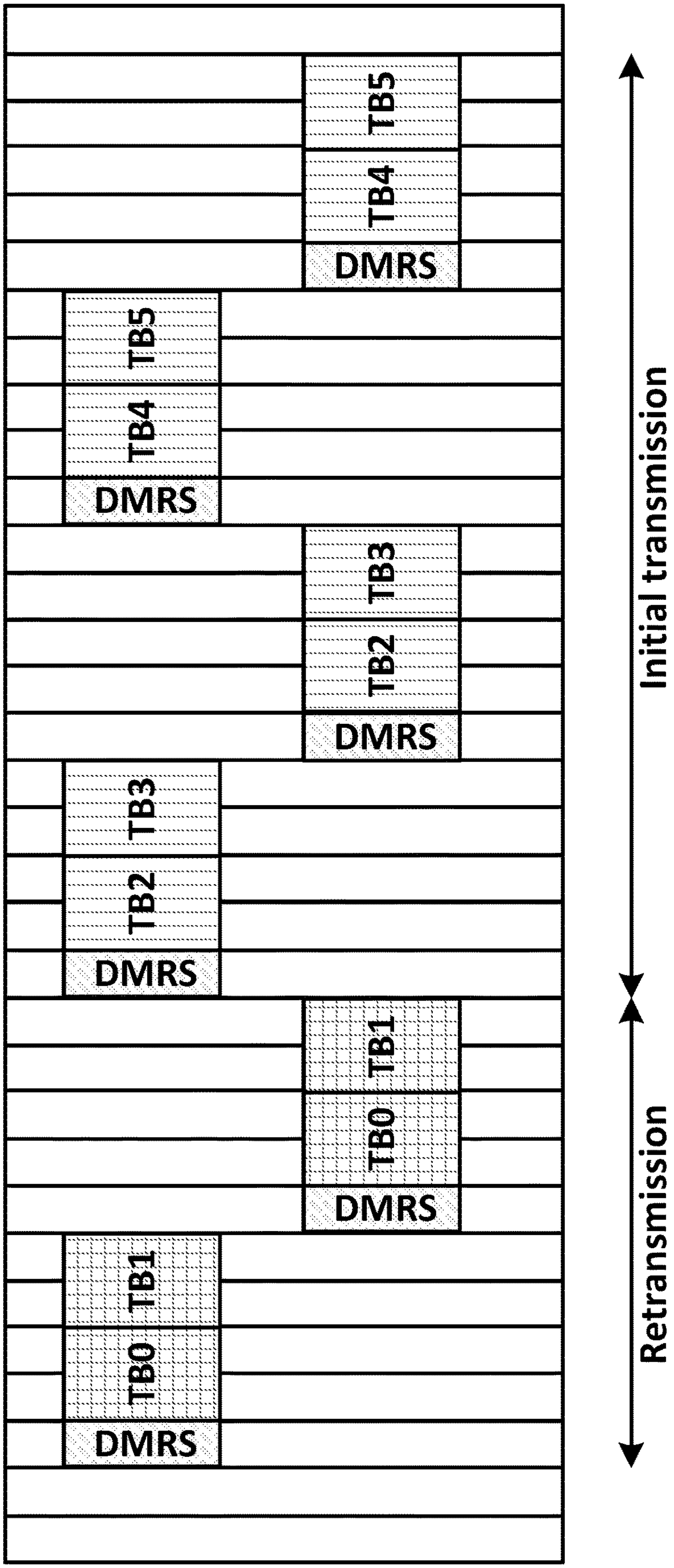
FIG. 11 illustrates an example of frequency hopping for retransmission and initial transmission in accordance with various embodiments.

FIG. 11 illustrates one example of frequency hopping for retransmission and initial transmission. In the example, 2 TBs are retransmitted and located at the beginning of the PDSCH or PUSCH. 4 TBs are initially transmitted after the retransmitted TBs.

Note that similar mechanism can be straightforwardly extended to the case when dedicated DMRS symbols are used for UCI, initial transmission and retransmission. In this case, UCI may be equally divided into two parts, where the first part is transmitted in the first hop and the second part is transmitted in the second hop. Further, retransmitted TBs follows the UCI and then initial transmission of the TBs.

Systems and Implementations

Figure 12:
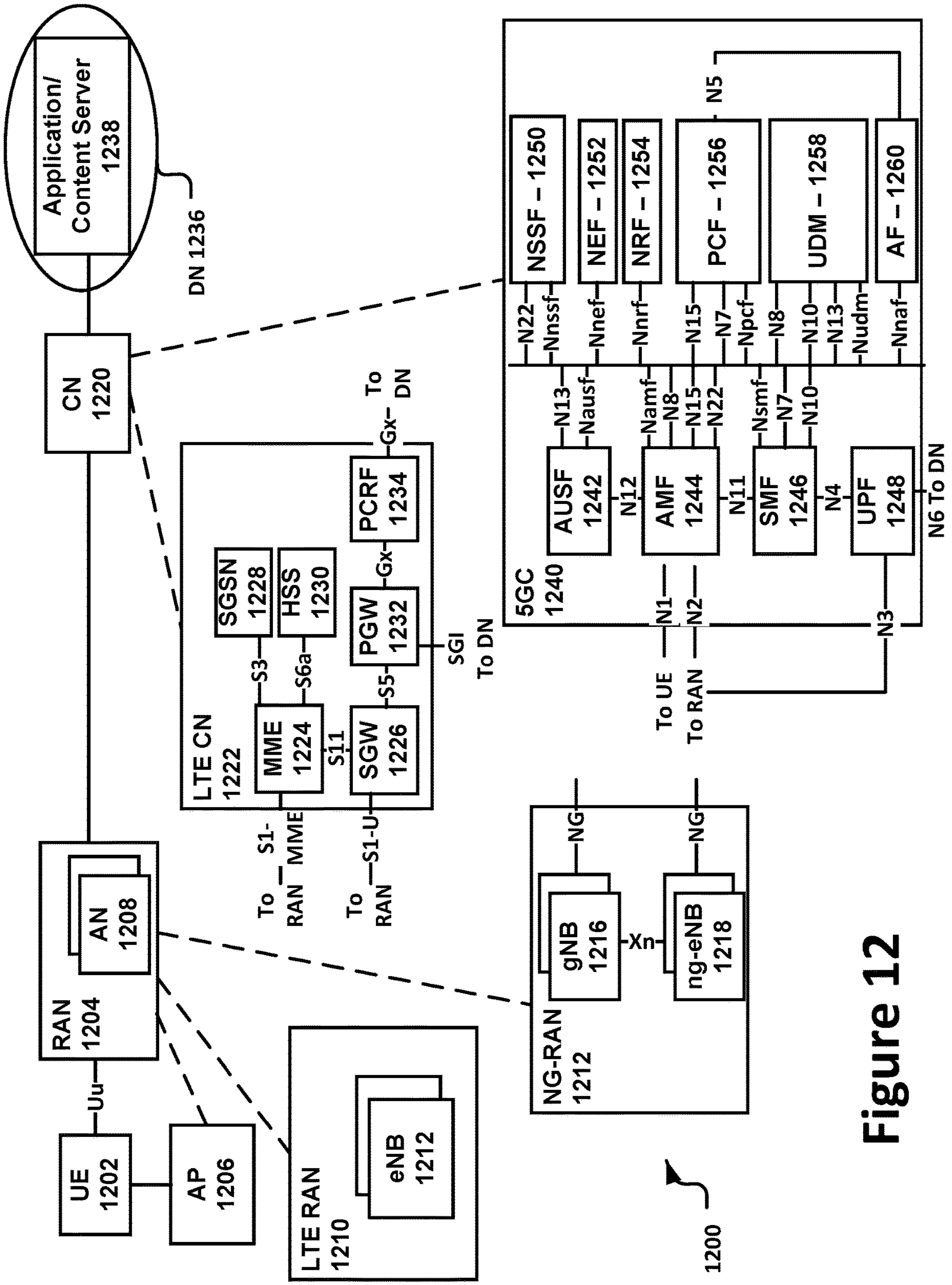
FIG. 12 schematically illustrates a wireless network in accordance with various embodiments.
Figure 13:
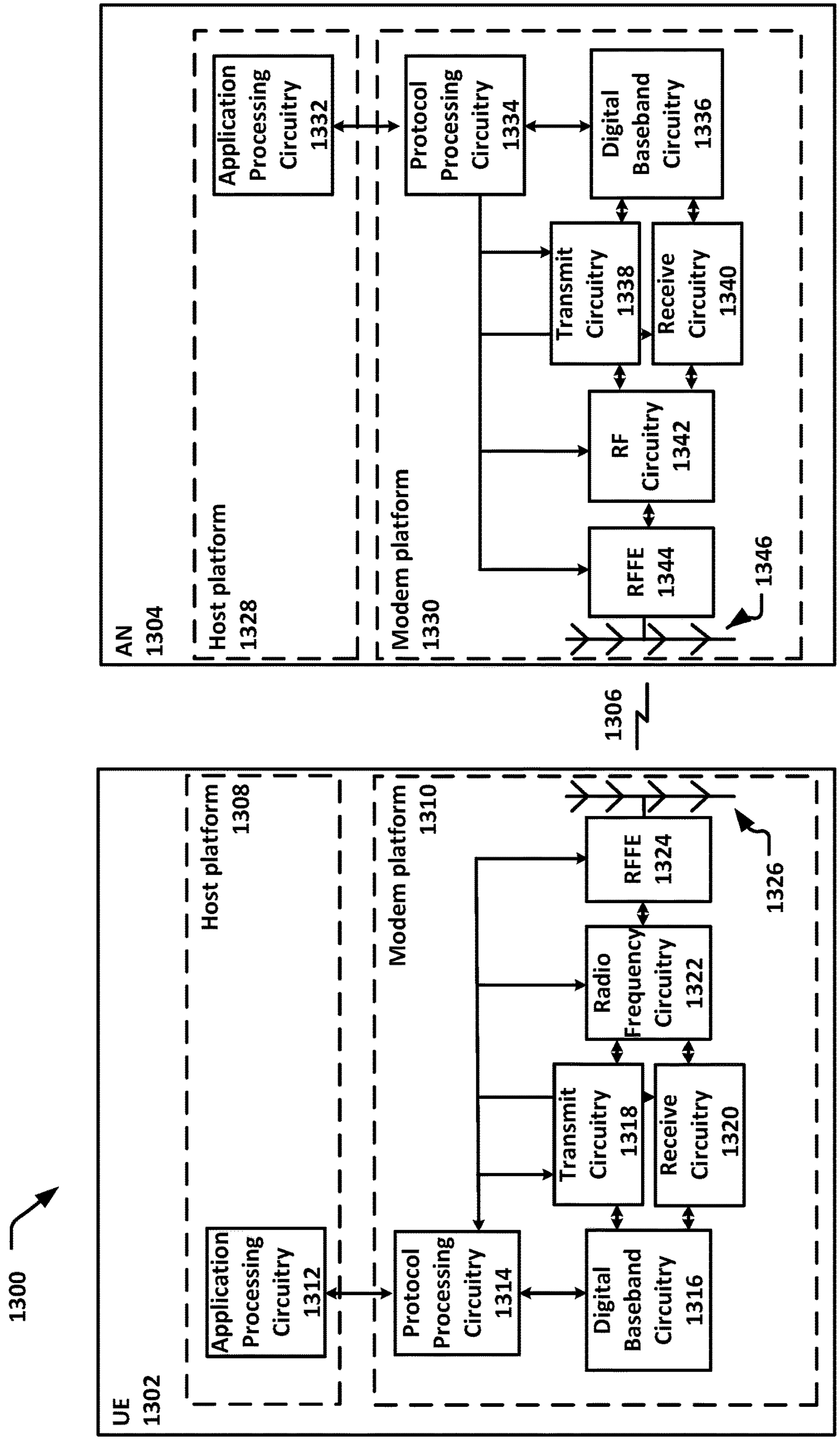
FIG. 13 schematically illustrates components of a wireless network in accordance with various embodiments.
Figure 14:
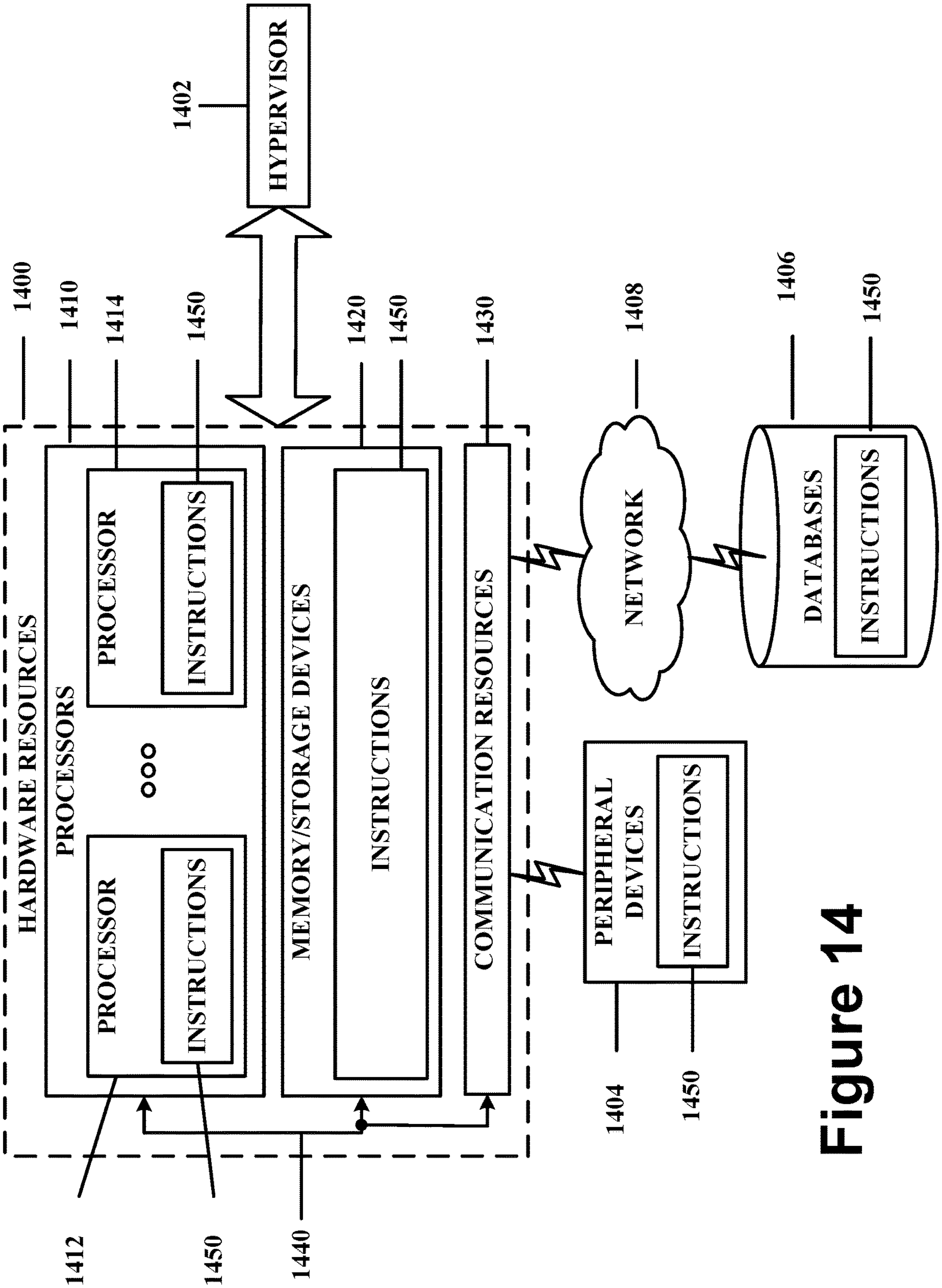
FIG. 14 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 12-14 illustrate various systems, devices, and components that may implement aspects of disclosed embodiments.

FIG. 12 illustrates a network 1200 in accordance with various embodiments. The network 1200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1200 may include a UE 1202, which may include any mobile or non-mobile computing device designed to communicate with a RAN 1204 via an over-the-air connection. The UE 1202 may be communicatively coupled with the RAN 1204 by a Uu interface. The UE 1202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1202 may additionally communicate with an AP 1206 via an over-the-air connection. The AP 1206 may manage a WLAN connection, which may serve to offload some/all network traffic from the RAN 1204. The connection between the UE 1202 and the AP 1206 may be consistent with any IEEE 802.11 protocol, wherein the AP 1206 could be a wireless fidelity (Wi-Fi®) router. In some embodiments, the UE 1202, RAN 1204, and AP 1206 may utilize cellular-WLAN aggregation (for example, LWA/LWIP). Cellular-WLAN aggregation may involve the UE 1202 being configured by the RAN 1204 to utilize both cellular radio resources and WLAN resources.

The RAN 1204 may include one or more access nodes, for example, AN 1208. AN 1208 may terminate air-interface protocols for the UE 1202 by providing access stratum protocols including RRC, PDCP, RLC, MAC, and L1 protocols. In this manner, the AN 1208 may enable data/voice connectivity between CN 1220 and the UE 1202. In some embodiments, the AN 1208 may be implemented in a discrete device or as one or more software entities running on server computers as part of, for example, a virtual network, which may be referred to as a CRAN or virtual baseband unit pool. The AN 1208 be referred to as a BS, gNB, RAN node, eNB, ng-eNB, NodeB, RSU, TRxP, TRP, etc. The AN 1208 may be a macrocell base station or a low power base station for providing femtocells, picocells or other like cells having smaller coverage areas, smaller user capacity, or higher bandwidth compared to macrocells.

In embodiments in which the RAN 1204 includes a plurality of ANs, they may be coupled with one another via an X2 interface (if the RAN 1204 is an LTE RAN) or an Xn interface (if the RAN 1204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1204 may each manage one or more cells, cell groups, component carriers, etc. to provide the UE 1202 with an air interface for network access. The UE 1202 may be simultaneously connected with a plurality of cells provided by the same or different ANs of the RAN 1204. For example, the UE 1202 and RAN 1204 may use carrier aggregation to allow the UE 1202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1202 or AN 1208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1204 may be an LTE RAN 1210 with eNBs, for example, eNB 1212. The LTE RAN 1210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1204 may be an NG-RAN 1214 with gNBs, for example, gNB 1216, or ng-eNBs, for example, ng-eNB 1218. The gNB 1216 may connect with 5G-enabled UEs using a 5G NR interface. The gNB 1216 may connect with a 5G core through an NG interface, which may include an N2 interface or an N3 interface. The ng-eNB 1218 may also connect with the 5G core through an NG interface, but may connect with a UE via an LTE air interface. The gNB 1216 and the ng-eNB 1218 may connect with each other over an Xn interface.

In some embodiments, the NG interface may be split into two parts, an NG user plane (NG-U) interface, which carries traffic data between the nodes of the NG-RAN 1214 and a UPF 1248 (e.g., N3 interface), and an NG control plane (NG-C) interface, which is a signaling interface between the nodes of the NG-RAN 1214 and an AMF 1244 (e.g., N2 interface).

The NG-RAN 1214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1202 can be configured with multiple BWPs where each BWP configuration has a different SCS. When a BWP change is indicated to the UE 1202, the SCS of the transmission is changed as well. Another use case example of BWP is related to power saving. In particular, multiple BWPs can be configured for the UE 1202 with different amount of frequency resources (for example, PRBs) to support data transmission under different traffic loading scenarios. A BWP containing a smaller number of PRBs can be used for data transmission with small traffic load while allowing power saving at the UE 1202 and in some cases at the gNB 1216. A BWP containing a larger number of PRBs can be used for scenarios with higher traffic load.

The RAN 1204 is communicatively coupled to CN 1220 that includes network elements to provide various functions to support data and telecommunications services to customers/subscribers (for example, users of UE 1202). The components of the CN 1220 may be implemented in one physical node or separate physical nodes. In some embodiments, NFV may be utilized to virtualize any or all of the functions provided by the network elements of the CN 1220 onto physical compute/storage resources in servers, switches, etc. A logical instantiation of the CN 1220 may be referred to as a network slice, and a logical instantiation of a portion of the CN 1220 may be referred to as a network sub-slice.

In some embodiments, the CN 1220 may be an LTE CN 1222, which may also be referred to as an EPC. The LTE CN 1222 may include MME 1224, SGW 1226, SGSN 1228, HSS 1230, PGW 1232, and PCRF 1234 coupled with one another over interfaces (or "reference points") as shown. Functions of the elements of the LTE CN 1222 may be briefly introduced as follows.

The MME 1224 may implement mobility management functions to track a current location of the UE 1202 to facilitate paging, bearer activation/deactivation, handovers, gateway selection, authentication, etc.

The SGW 1226 may terminate an S1 interface toward the RAN and route data packets between the RAN and the LTE CN 1222. The SGW 1226 may be a local mobility anchor point for inter-RAN node handovers and also may provide an anchor for inter-3GPP mobility. Other responsibilities may include lawful intercept, charging, and some policy enforcement.

The SGSN 1228 may track a location of the UE 1202 and perform security functions and access control. In addition, the SGSN 1228 may perform inter-EPC node signaling for mobility between different RAT networks; PDN and S-GW selection as specified by MME 1224; MME selection for handovers; etc. The S3 reference point between the MME 1224 and the SGSN 1228 may enable user and bearer information exchange for inter-3GPP access network mobility in idle/active states.

The HSS 1230 may include a database for network users, including subscription-related information to support the network entities' handling of communication sessions. The HSS 1230 can provide support for routing/roaming, authentication, authorization, naming/addressing resolution, location dependencies, etc. An S6a reference point between the HSS 1230 and the MME 1224 may enable transfer of subscription and authentication data for authenticating/authorizing user access to the LTE CN 1220.

The PGW 1232 may terminate an SGi interface toward a data network (DN) 1236 that may include an application/content server 1238. The PGW 1232 may route data packets between the LTE CN 1222 and the data network 1236. The PGW 1232 may be coupled with the SGW 1226 by an S5 reference point to facilitate user plane tunneling and tunnel management. The PGW 1232 may further include a node for policy enforcement and charging data collection (for example, PCEF). Additionally, the SGi reference point between the PGW 1232 and the data network 1236 may be an operator external public, a private PDN, or an intra-operator packet data network, for example, for provision of IMS services. The PGW 1232 may be coupled with a PCRF 1234 via a Gx reference point.

The PCRF 1234 is the policy and charging control element of the LTE CN 1222. The PCRF 1234 may be communicatively coupled to the app/content server 1238 to determine appropriate QoS and charging parameters for service flows. The PCRF 1232 may provision associated rules into a PCEF (via Gx reference point) with appropriate TFT and QCI.

In some embodiments, the CN 1220 may be a 5GC 1240. The 5GC 1240 may include an AUSF 1242, AMF 1244, SMF 1246, UPF 1248, NSSF 1250, NEF 1252, NRF 1254, PCF 1256, UDM 1258, and AF 1260 coupled with one another over interfaces (or "reference points") as shown. Functions of the elements of the 5GC 1240 may be briefly introduced as follows.

The AUSF 1242 may store data for authentication of UE 1202 and handle authentication-related functionality. The AUSF 1242 may facilitate a common authentication framework for various access types. In addition to communicating with other elements of the 5GC 1240 over reference points as shown, the AUSF 1242 may exhibit an Nausf service-based interface.

The AMF 1244 may allow other functions of the 5GC 1240 to communicate with the UE 1202 and the RAN 1204 and to subscribe to notifications about mobility events with respect to the UE 1202. The AMF 1244 may be responsible for registration management (for example, for registering UE 1202), connection management, reachability management, mobility management, lawful interception of AMF-related events, and access authentication and authorization. The AMF 1244 may provide transport for SM messages between the UE 1202 and the SMF 1246, and act as a transparent proxy for routing SM messages. AMF 1244 may also provide transport for SMS messages between UE 1202 and an SMSF. AMF 1244 may interact with the AUSF 1242 and the UE 1202 to perform various security anchor and context management functions. Furthermore, AMF 1244 may be a termination point of a RAN CP interface, which may include or be an N2 reference point between the RAN 1204 and the AMF 1244; and the AMF 1244 may be a termination point of NAS (N1) signaling, and perform NAS ciphering and integrity protection. AMF 1244 may also support NAS signaling with the UE 1202 over an N3 IWF interface.

The SMF 1246 may be responsible for SM (for example, session establishment, tunnel management between UPF 1248 and AN 1208); UE IP address allocation and management (including optional authorization); selection and control of UP function; configuring traffic steering at UPF 1248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1244 over N2 to AN 1208; and determining SSC mode of a session. SM may refer to management of a PDU session, and a PDU session or "session" may refer to a PDU connectivity service that provides or enables the exchange of PDUs between the UE 1202 and the data network 1236.

The UPF 1248 may act as an anchor point for intra-RAT and inter-RAT mobility, an external PDU session point of interconnect to data network 1236, and a branching point to support multi-homed PDU session. The UPF 1248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1248 may include an uplink classifier to support routing traffic flows to a data network.

The NSSF 1250 may select a set of network slice instances serving the UE 1202. The NSSF 1250 may also determine allowed NSSAI and the mapping to the subscribed S-NSSAIs, if needed. The NSSF 1250 may also determine the AMF set to be used to serve the UE 1202, or a list of candidate AMFs based on a suitable configuration and possibly by querying the NRF 1254. The selection of a set of network slice instances for the UE 1202 may be triggered by the AMF 1244 with which the UE 1202 is registered by interacting with the NS SF 1250, which may lead to a change of AMF. The NSSF 1250 may interact with the AMF 1244 via an N22 reference point; and may communicate with another NSSF in a visited network via an N31 reference point (not shown). Additionally, the NSSF 1250 may exhibit an Nnssf service-based interface.

The NEF 1252 may securely expose services and capabilities provided by 3GPP network functions for third party, internal exposure/re-exposure, AFs (e.g., AF 1260), edge computing or fog computing systems, etc. In such embodiments, the NEF 1252 may authenticate, authorize, or throttle the AFs. NEF 1252 may also translate information exchanged with the AF 1260 and information exchanged with internal network functions. For example, the NEF 1252 may translate between an AF-Service-Identifier and an internal 5GC information. NEF 1252 may also receive information from other NFs based on exposed capabilities of other NFs. This information may be stored at the NEF 1252 as structured data, or at a data storage NF using standardized interfaces. The stored information can then be re-exposed by the NEF 1252 to other NFs and AFs, or used for other purposes such as analytics. Additionally, the NEF 1252 may exhibit an Nnef service-based interface.

The NRF 1254 may support service discovery functions, receive NF discovery requests from NF instances, and provide the information of the discovered NF instances to the NF instances. NRF 1254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1254 may exhibit the Nnrf service-based interface.

The PCF 1256 may provide policy rules to control plane functions to enforce them, and may also support unified policy framework to govern network behavior. The PCF 1256 may also implement a front end to access subscription information relevant for policy decisions in a UDR of the UDM 1258. In addition to communicating with functions over reference points as shown, the PCF 1256 exhibit an Npcf service-based interface.

The UDM 1258 may handle subscription-related information to support the network entities' handling of communication sessions, and may store subscription data of UE 1202. For example, subscription data may be communicated via an N8 reference point between the UDM 1258 and the AMF 1244. The UDM 1258 may include two parts, an application front end and a UDR. The UDR may store subscription data and policy data for the UDM 1258 and the PCF 1256, and/or structured data for exposure and application data (including PFDs for application detection, application request information for multiple UEs 1202) for the NEF 1252. The Nudr service-based interface may be exhibited by the UDR 221 to allow the UDM 1258, PCF 1256, and NEF 1252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1258 may exhibit the Nudm service-based interface.

The AF 1260 may provide application influence on traffic routing, provide access to NEF, and interact with the policy framework for policy control.

In some embodiments, the 5GC 1240 may enable edge computing by selecting operator/3$^{rd}$ party services to be geographically close to a point that the UE 1202 is attached to the network. This may reduce latency and load on the network. To provide edge-computing implementations, the 5GC 1240 may select a UPF 1248 close to the UE 1202 and execute traffic steering from the UPF 1248 to data network 1236 via the N6 interface. This may be based on the UE subscription data, UE location, and information provided by the AF 1260. In this way, the AF 1260 may influence UPF (re)selection and traffic routing. Based on operator deployment, when AF 1260 is considered to be a trusted entity, the network operator may permit AF 1260 to interact directly with relevant NFs. Additionally, the AF 1260 may exhibit an Naf service-based interface.

The data network 1236 may represent various network operator services, Internet access, or third party services that may be provided by one or more servers including, for example, application/content server 1238.

FIG. 13 schematically illustrates a wireless network 1300 in accordance with various embodiments. The wireless network 1300 may include a UE 1302 in wireless communication with an AN 1304. The UE 1302 and AN 1304 may be similar to, and substantially interchangeable with, like-named components described elsewhere herein.

The UE 1302 may be communicatively coupled with the AN 1304 via connection 1306. The connection 1306 is illustrated as an air interface to enable communicative coupling, and can be consistent with cellular communications protocols such as an LTE protocol or a 5G NR protocol operating at mmWave or sub-6 GHz frequencies.

The UE 1302 may include a host platform 1308 coupled with a modem platform 1310. The host platform 1308 may include application processing circuitry 1312, which may be coupled with protocol processing circuitry 1314 of the modem platform 1310. The application processing circuitry 1312 may run various applications for the UE 1302 that source/sink application data. The application processing circuitry 1312 may further implement one or more layer operations to transmit/receive application data to/from a data network. These layer operations may include transport (for example UDP) and Internet (for example, IP) operations The protocol processing circuitry 1314 may implement one or more of layer operations to facilitate transmission or reception of data over the connection 1306. The layer operations implemented by the protocol processing circuitry 1314 may include, for example, MAC, RLC, PDCP, RRC and NAS operations.

The modem platform 1310 may further include digital baseband circuitry 1316 that may implement one or more layer operations that are "below" layer operations performed by the protocol processing circuitry 1314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1310 may further include transmit circuitry 1318, receive circuitry 1320, RF circuitry 1322, and RF front end (RFFE) 1324, which may include or connect to one or more antenna panels 1326. Briefly, the transmit circuitry 1318 may include a digital-to-analog converter, mixer, intermediate frequency (IF) components, etc.; the receive circuitry 1320 may include an analog-to-digital converter, mixer, IF components, etc.; the RF circuitry 1322 may include a low-noise amplifier, a power amplifier, power tracking components, etc.; RFFE 1324 may include filters (for example, surface/bulk acoustic wave filters), switches, antenna tuners, beamforming components (for example, phase-array antenna components), etc. The selection and arrangement of the components of the transmit circuitry 1318, receive circuitry 1320, RF circuitry 1322, RFFE 1324, and antenna panels 1326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1314 may include one or more instances of control circuitry (not shown) to provide control functions for the transmit/receive components.

A UE reception may be established by and via the antenna panels 1326, RFFE 1324, RF circuitry 1322, receive circuitry 1320, digital baseband circuitry 1316, and protocol processing circuitry 1314. In some embodiments, the antenna panels 1326 may receive a transmission from the AN 1304 by receive-beamforming signals received by a plurality of antennas/antenna elements of the one or more antenna panels 1326.

A UE transmission may be established by and via the protocol processing circuitry 1314, digital baseband circuitry 1316, transmit circuitry 1318, RF circuitry 1322, RFFE 1324, and antenna panels 1326. In some embodiments, the transmit components of the UE 1304 may apply a spatial filter to the data to be transmitted to form a transmit beam emitted by the antenna elements of the antenna panels 1326.

Similar to the UE 1302, the AN 1304 may include a host platform 1328 coupled with a modem platform 1330. The host platform 1328 may include application processing circuitry 1332 coupled with protocol processing circuitry 1334 of the modem platform 1330. The modem platform may further include digital baseband circuitry 1336, transmit circuitry 1338, receive circuitry 1340, RF circuitry 1342, RFFE circuitry 1344, and antenna panels 1346. The components of the AN 1304 may be similar to and substantially interchangeable with like-named components of the UE 1302. In addition to performing data transmission/reception as described above, the components of the AN 1308 may perform various logical functions that include, for example, RNC functions such as radio bearer management, uplink and downlink dynamic radio resource management, and data packet scheduling.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440 or other interface circuitry. For embodiments where node virtualization (e.g., NFV) is utilized, a hypervisor 1402 may be executed to provide an execution environment for one or more network slices/sub-slices to utilize the hardware resources 1400.

The processors 1410 may include, for example, a processor 1412 and a processor 1414. The processors 1410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface controllers, components, or other suitable devices to communicate with one or more peripheral devices 1404 or one or more databases 1406 or other network elements via a network 1408. For example, the communication resources 1430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Example Procedures

Figure 15:
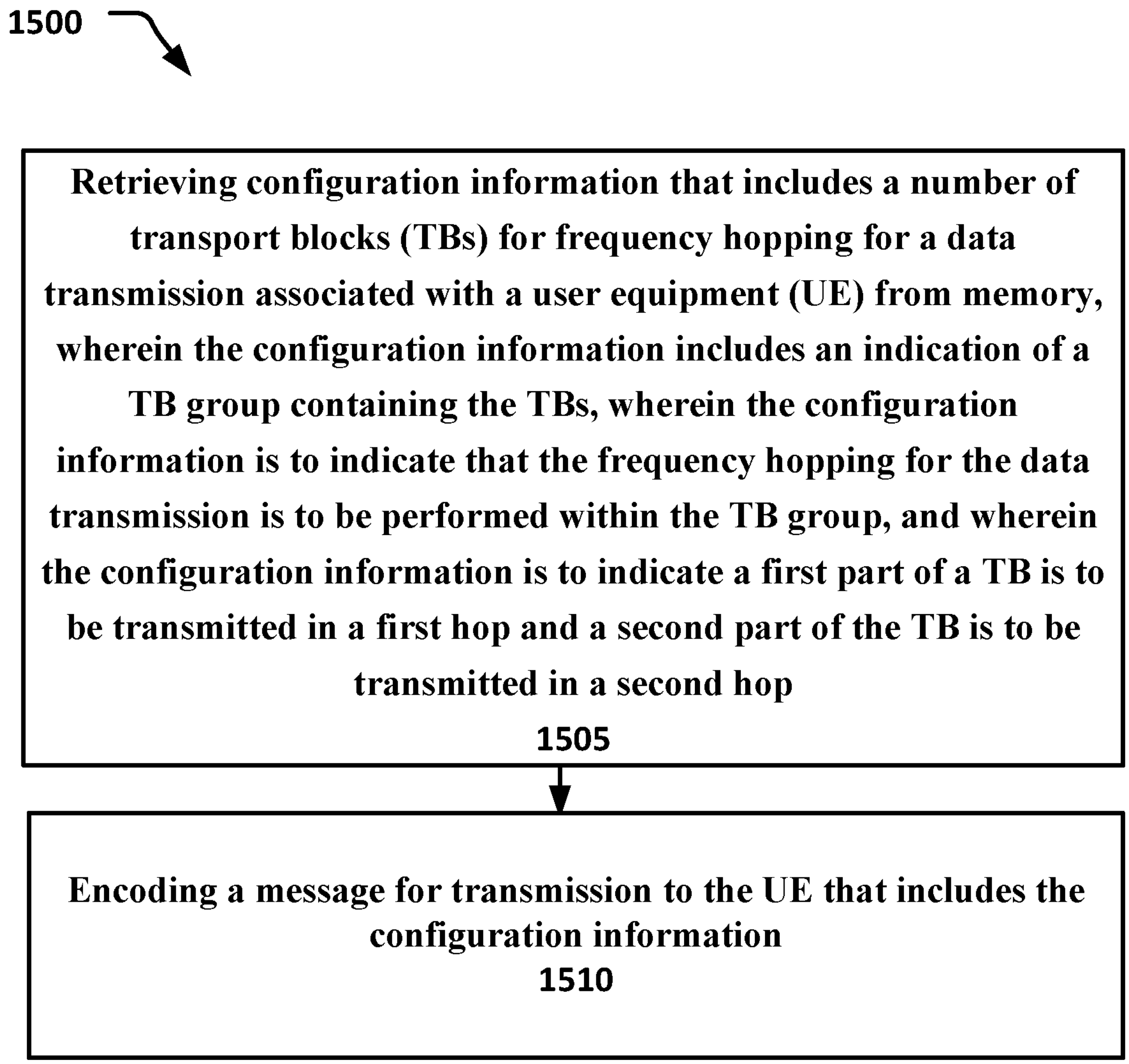
FIGS. 15, 16, and 17 depict examples of procedures for practicing the various embodiments discussed herein.

In some embodiments, the electronic device(s), network(s), system(s), chip(s) or component(s), or portions or implementations thereof, of FIGS. 12-14, or some other figure herein, may be configured to perform one or more processes, techniques, or methods as described herein, or portions thereof. One such process is depicted in FIG. 15. In this example, the process 1500 includes, at 1505, retrieving configuration information that includes a number of transport blocks (TBs) for frequency hopping for a data transmission associated with a user equipment (UE) from memory, wherein the configuration information includes an indication of a TB group containing the TBs, wherein the configuration information is to indicate that the frequency hopping for the data transmission is to be performed within the TB group, and wherein the configuration information is to indicate a first part of a TB is to be transmitted in a first hop and a second part of the TB is to be transmitted in a second hop. The process further includes, at 1510, encoding a message for transmission to the UE that includes the configuration information.

Figure 16:
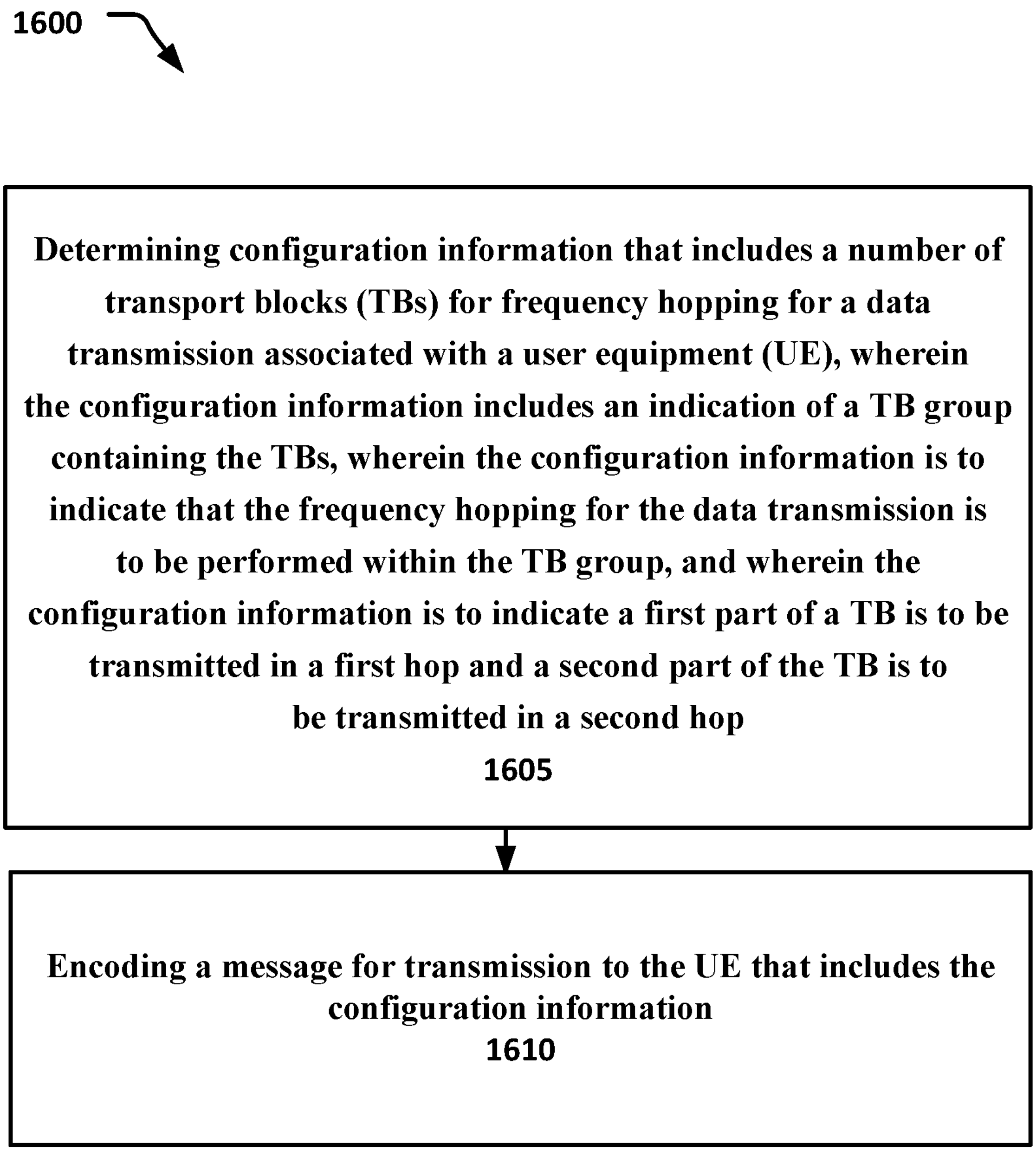

Another such process is illustrated in FIG. 16. In this example, the process 1600 includes, at 1605, determining configuration information that includes a number of transport blocks (TBs) for frequency hopping for a data transmission associated with a user equipment (UE), wherein the configuration information includes an indication of a TB group containing the TBs, wherein the configuration information is to indicate that the frequency hopping for the data transmission is to be performed within the TB group, and wherein the configuration information is to indicate a first part of a TB is to be transmitted in a first hop and a second part of the TB is to be transmitted in a second hop. The process further includes, at 1610, encoding a message for transmission to the UE that includes the configuration information.

Figure 17:
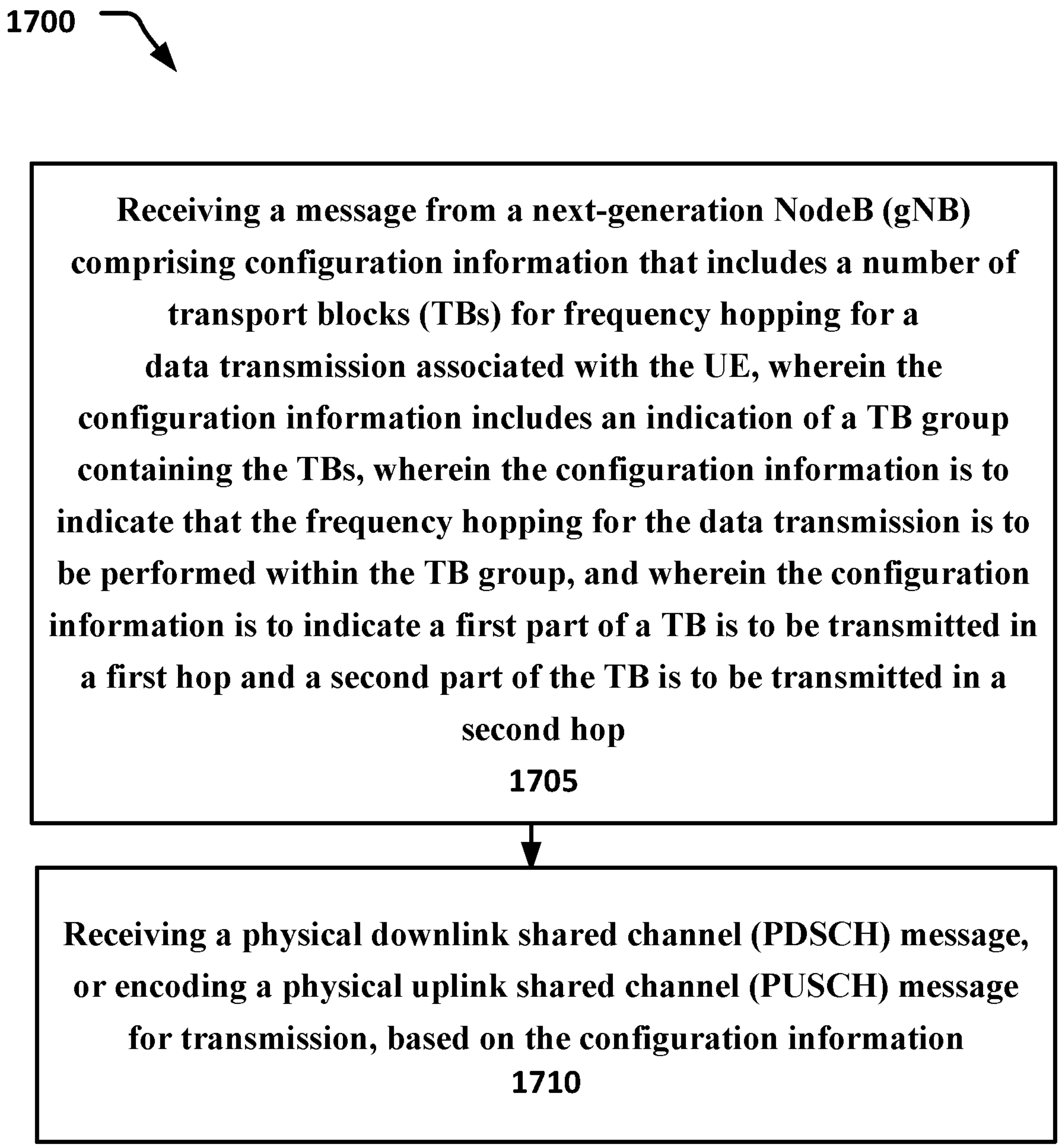

Another such process is illustrated in FIG. 17. In this example, the process 1700 includes, at 1705, receiving a message from a next-generation NodeB (gNB) comprising configuration information that includes a number of transport blocks (TBs) for frequency hopping for a data transmission associated with the UE, wherein the configuration information includes an indication of a TB group containing the TBs, wherein the configuration information is to indicate that the frequency hopping for the data transmission is to be performed within the TB group, and wherein the configuration information is to indicate a first part of a TB is to be transmitted in a first hop and a second part of the TB is to be transmitted in a second hop. The process further includes, at 1710, receiving a physical downlink shared channel (PDSCH) message, or encoding a physical uplink shared channel (PUSCH) message for transmission, based on the configuration information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of wireless communication to schedule multiple transport block transmissions for above 52.6 GHz carrier frequency, the method comprising:

UE detects a downlink control information (DCI); and

UE determine the scheduling information carried in the DCI.

Example 2 may include the method of example 1 or some other example herein, wherein the DCI includes information on the start symbol (S) of the allocated time resource, the number of symbols for a TB or a TB group (L), the total number of symbols (X) of the allocated time resource or the number of scheduled TBs or TB groups (M), and the differentiation on new transmission or retransmission for each of the M scheduled TBs or TB groups (NRI).

Example 3 may include the method of example 2 or some other example herein, wherein each entry of time domain resource allocation (TDRA) field in the DCI indicates the information S, L, M for the allocated data transmission, however, NRI is a separate field in the DCI.

Example 4 may include the method of example 2 or some other example herein, wherein each entry of TDRA field indicate S, M for the allocated data transmission, however, L and NRI are separate fields in the DCI.

Example 5 may include the method of example 2 or some other example herein, wherein each entry of TDRA field indicates the information S, L, X for the allocated data transmission, however, NRI is a separate field in the DCI.

Example 6 may include the method of example 2 or some other example herein, wherein each entry of TDRA field indicate S, X for the allocated data transmission, however, L and NRI are separate fields in the DCI.

Example 7 may include the method of example 1 or some other example herein, wherein NRI field in the DCI indicates the number of scheduled TBs or TB groups, e.g. M, and differentiates each of the M TBs or TB groups as a new transmission or retransmission.

Example 8 may include the method of example 7 or some other example herein, wherein Each entry of TDRA field in the DCI indicates the information S, L for the allocated data transmission.

Example 9 may include the method of example 7 or some other example herein, wherein the information S and L are respectively indicated by separate fields in the DCI.

Example 10 may include the method of example 7 or some other example herein, wherein the NRI field is interpreted into a bitmap of length $M_{max}$ and one special bit, $M_{max}$ is the maximum number of scheduled TBs or TB groups by the DCI.

Example 11 may include the method of example 10 or some other example herein, wherein the first M bits in the bitmap respectively indicate a corresponding TB or TB group is a new transmission or retransmission. The 'M+1'th bit, if existed in the bitmap which does not have a corresponding TB or TB group is set to a value different from the 'M'th bit. Each of the last $M_{max}$−M bits in the bitmap, if existed, are set to same value as the 'M+1'th bit.

Example 12 may include the method of example 11 or some other example herein, wherein the special bit has a value that is different from the 'M'th bit in the bitmap.

Example 13 may include the method of example 12 or some other example herein, wherein UE considers the TBs corresponding to the last $M_{max}$−M bits in the bitmap, if existed, that have the same value as the special bit to not have been scheduled.

Example 14 may include the method of example 11 or some other example herein, wherein the special bit indicates whether the last bits in the bitmap that have the same value are valid to indicate schedule TBs or TB groups or not.

Example 15 may include the method of example 14 or some other example herein, wherein if the special bit is '1', UE considers that the TBs corresponding to the last $M_{max}$−M bits in the bitmap that have the same value to not have been scheduled. Otherwise, if the special bit is '0', UE considers all bits in the bitmap indicate scheduled TB or TB groups.

Example 16 may include the method of example 7 or some other example herein, wherein the NRI field in the DCI is interpreted into a bitmap of length $M_{max}$+1, $M_{max}$ is the maximum number of scheduled TBs or TB groups by the DCI.

Example 17 may include the method of example 16 or some other example herein, wherein the first M bits in the bitmap respectively indicate a corresponding TB or TB group is a new transmission or retransmission. The 'M+1'th bit in the bitmap which does not have a corresponding TB or TB group is set to a value different from the 'M'th bit. Each of the last $M_{max}$+1−M bits in the bitmap are set to same value as the 'M+1'th bit.

Example 18 may include the method of example 17 or some other example herein, wherein UE considers the last $M_{max}$+1−M bits in the bitmap that have the same value as the last bit of the bitmap are not associated with scheduled TBs.

Example 19 may include the method of example 1 or some other example herein, wherein the NRI field in the DCI is interpreted into a bitmap of length $M_{max}$, $M_{max}$ is the maximum number of scheduled TBs or TB groups by the DCI. Each bit in the bitmap respectively indicate a corresponding TB or TB group as a new transmission or retransmission.

Example 20 may include the method of example 19 or some other example herein, wherein if early termination happens, the number of transmitted TBs or TB groups is less than $M_{max}$.

Example 21 may include a method comprising:

receiving or transmitting a downlink control information (DCI) to schedule transmission of multiple transport blocks (TBs), wherein the DCI indicates one or more of: a start symbol (S) of an allocated time resource, a number of symbols for a TB or a TB group (L), a total number of symbols (X) of the allocated time resource, a number of scheduled TBs or TB groups (M), and/or a new transmission or retransmission indicator (NRI) to indicate whether the respective TBs are a new transmission or a retransmission; and receiving or transmitting the transport blocks based on the DCI.

Example 22 may include the method of example 21 or some other example herein, wherein one or more of S, L, X, M, or NRI are included in a time domain resource allocation (TDRA) field for the respective TB, and one or more other of S, L, X, M, or NRI are included in a separate field in the DCI.

Example 23 may include the method of example 21-22 or some other example herein, wherein the method is performed by a user equipment (UE) or a portion thereof.

Example 24 may include the method of example 21-22 or some other example herein, wherein the method is performed by a next generation Node B (gNB) or a portion thereof.

Example X1 may include a method of a user equipment (UE), the method comprising:

receiving, from gNodeB (gNB), a number of transport blocks (TB) for frequency hopping; and performing frequency hopping for transmission of a physical uplink shared channel (PUSCH) in accordance with the indicated number of TBs; or receiving a physical downlink shared channel (PDSCH) with frequency hopping in accordance with the indicated number of TBs.

Example X2 may include the method of example X1 or some other example herein, wherein frequency hopping is applied for a physical downlink shared channel (PDSCH) or PUSCH transmission.

Example X3 may include wherein a number of transport blocks (TB) can be grouped into a TB group, wherein frequency hopping is performed within the TB group.

Example X4 may include the method of example X1 or some other example herein, wherein the number of TBs in the TB group can be configured by higher layers via minimum system information (MSI), remaining minimum system information (RMSI), other system information (OSI) or dedicated radio resource control (RRC) signalling or dynamically indicated in the downlink control information (DCI) or a combination thereof.

Example X5 may include the method of example X1 or some other example herein, wherein a first part of a TB is transmitted in a first hop and a second part of the TB is transmitted in a second hop.

Example X6 may include the method of example X1 or some other example herein, wherein mapping order of a TB can be defined in a time first and frequency second manner.

Example X7 may include the method of example X1 or some other example herein, wherein dedicated DMRS symbols are allocated in each hop before the transmitted of a first TB within the TB group or a whole hopping boundary where UE one frequency hopping.

Example X8 may include the method of example X1 or some other example herein, wherein when one symbol is allocated for a TB, one or more TBs may be mixed into the same symbol when frequency hopping is applied.

Example X9 may include the method of example X1 or some other example herein, wherein frequency hopping may be performed within a number of symbols within a physical downlink shared channel (PDSCH) or PUSCH transmission.

Example X10 may include the method of example X1 or some other example herein, wherein the number of symbols for the whole hopping boundary where UE performs one frequency hopping can be configured by higher layers via MSI, RMSI (SIB1), OSI or RRC signalling or dynamically indicated in the DCI or a combination thereof.

Example X11 may include the method of example X1 or some other example herein, wherein if time domain bundling for hybrid automatic repeat request-acknowledgement (HARQ-ACK) feedback is enabled, the number of symbols for a whole hopping boundary or the number of TBs within a TB group for frequency hopping can be determined in accordance with the configured or indicated time domain bundling size for HARQ-ACK feedback.

Example XX12 may include the method of example X1 or some other example herein, wherein for the mixed initial transmission and retransmission in a PDSCH or PUSCH, when frequency hopping is enabled, retransmission of the TBs is grouped first for frequency hopping and followed by initial transmission of the TBs on PDSCH or PUSCH.

Example X13 may include the method of example X1 or some other example herein, wherein for uplink control channel (UCI) multiplexed on PUSCH, UCI may be equally divided into two parts, where the first part is transmitted in the first hop and the second part is transmitted in the second hop, wherein retransmitted TBs follows the UCI and then initial transmission of the TBs.

Example X14 may include a method of a user equipment (UE), the method comprising:

receiving an indication of a number of transport blocks (TBs) for frequency hopping; and encoding a physical uplink shared channel (PUSCH) for transmission with frequency hopping in accordance with the indicated number of TBs; or receiving a physical downlink shared channel (PDSCH) with frequency hopping in accordance with the indicated number of TBs.

Example X15 may include the method of example X14 or some other example herein, wherein TBs are grouped into respective TB groups based on the indicated number of TBs, wherein the frequency hopping is performed within the respective TB groups.

Example X16 may include the method of example X14-X15 or some other example herein, wherein the indication of the number of TBs is received via minimum system information (MSI), remaining minimum system information (RMSI), other system information (OSI) or dedicated radio resource control (RRC) signalling or dynamically indicated in the downlink control information (DCI) or a combination thereof.

Example X17 may include the method of example X14-X16 or some other example herein, wherein, as part of the frequency hopping, a first part of a TB is transmitted in a first hop and a second part of the TB is transmitted in a second hop.

Example Y1 includes an apparatus comprising:

memory to store configuration information that includes a number of transport blocks (TBs) for frequency hopping for a data transmission associated with a user equipment (UE); and processing circuitry, coupled with the memory, to:

retrieve the configuration information from memory, wherein the configuration information includes an indication of a TB group containing the TBs, wherein the configuration information is to indicate that the frequency hopping for the data transmission is to be performed within the TB group, and wherein the configuration information is to indicate a first part of a TB is to be transmitted in a first hop and a second part of the TB is to be transmitted in a second hop; and encode a message for transmission to the UE that includes the configuration information.

Example Y2 includes the apparatus of example Y1 or some other example herein, wherein the data transmission associated with the UE is a physical downlink shared channel (PDSCH) transmission, or a physical uplink shared channel (PUSCH) transmission.

Example Y3 includes the apparatus of example Y1 or some other example herein, wherein the configuration information in the message is included in downlink control information (DCI), or the message is encoded for transmission via: minimum system information (MSI), remaining minimum system information (RMSI), other system information (OSI), or dedicated radio resource control (RRC) signaling.

Example Y4 includes the apparatus of example Y1 or some other example herein, wherein the configuration information includes a TB mapping order defined in a time-first and frequency-second manner.

Example Y5 includes the apparatus of example Y1 or some other example herein, wherein the configuration information is to indicate that a respective dedicated demodulation reference signal (DMRS) symbol is allocated in each respective hop before transmission of a first TB within the TB group.

Example Y6 includes the apparatus of example Y1 or some other example herein, wherein the configuration information is to indicate that one or more TBs are mixed into a common symbol when frequency hopping is applied.

Example Y7 includes the apparatus of example Y1 or some other example herein, wherein the configuration information is to indicate a number of symbols for a hopping boundary, or a number of TBs within a TB group for frequency hopping, based on a time domain bundling size for hybrid automatic repeat request-acknowledgement (HARQ-ACK) feedback.

Example Y8 includes the apparatus of any of examples Y1-Y7 or some other example herein, wherein the configuration information is to indicate:

for a mixed initial transmission and retransmission in a PDSCH or PUSCH, when frequency hopping is enabled: retransmission of TBs is grouped first for frequency hopping, followed by an initial transmission of the TBs on PDSCH or PUSCH; or for uplink control channel (UCI) multiplexed on PUSCH: UCI is equally divided into a first part and a second part, wherein the first part is transmitted in the first hop and the second part is transmitted in the second hop, and wherein retransmitted TBs follow the UCI and initial transmission of the TBs follow retransmitted TBs.

Example Y9 includes one or more computer-readable media storing instructions that, when executed by one or more processors, cause a next-generation NodeB (gNB) to:

determine configuration information that includes a number of transport blocks (TBs) for frequency hopping for a data transmission associated with a user equipment (UE), wherein the configuration information includes an indication of a TB group containing the TBs, wherein the configuration information is to indicate that the frequency hopping for the data transmission is to be performed within the TB group, and wherein the configuration information is to indicate a first part of a TB is to be transmitted in a first hop and a second part of the TB is to be transmitted in a second hop; and encode a message for transmission to the UE that includes the configuration information.

Example Y10 includes the one or more computer-readable media of example Y9 or some other example herein, wherein the data transmission associated with the UE is a physical downlink shared channel (PDSCH) transmission, or a physical uplink shared channel (PUSCH) transmission.

Example Y11 includes the one or more computer-readable media of example Y9 or some other example herein, wherein the configuration information in the message is included in downlink control information (DCI), or the message is encoded for transmission via: minimum system information (MSI), remaining minimum system information (RMSI), other system information (OSI), or dedicated radio resource control (RRC) signaling.

Example Y12 includes the one or more computer-readable media of example Y9 or some other example herein, wherein the configuration information includes a TB mapping order defined in a time-first and frequency-second manner.

Example Y13 includes the one or more computer-readable media of example Y9 or some other example herein, wherein the configuration information is to indicate that a respective dedicated demodulation reference signal (DMRS) symbol is allocated in each respective hop before transmission of a first TB within the TB group.

Example Y14 includes the one or more computer-readable media of example Y9 or some other example herein, wherein the configuration information is to indicate that one or more TBs are mixed into a common symbol when frequency hopping is applied.

Example Y15 includes the one or more computer-readable media of example Y9 or some other example herein, wherein the configuration information is to indicate a number of symbols for a hopping boundary, or a number of TBs within a TB group for frequency hopping, based on a time domain bundling size for hybrid automatic repeat request-acknowledgement (HARQ-ACK) feedback.

Example Y16 includes the one or more computer-readable media of any of examples Y9-Y15 or some other example herein, wherein the configuration information is to indicate:

for a mixed initial transmission and retransmission in a PDSCH or PUSCH when frequency hopping is enabled: retransmission of TBs is grouped first for frequency hopping, followed by an initial transmission of the TBs on PDSCH or PUSCH; or for uplink control channel (UCI) multiplexed on PUSCH: UCI is equally divided into a first part and a second part, wherein the first part is transmitted in the first hop and the second part is transmitted in the second hop, and wherein retransmitted TBs follow the UCI and initial transmission of the TBs follow retransmitted TBs.

Example Y17 includes one or more computer-readable media storing instructions that, when executed by one or more processors, cause a user equipment (UE) to:

receive a message from a next-generation NodeB (gNB) comprising configuration information that includes a number of transport blocks (TBs) for frequency hopping for a data transmission associated with the UE, wherein the configuration information includes an indication of a TB group containing the TBs, wherein the configuration information is to indicate that the frequency hopping for the data transmission is to be performed within the TB group, and wherein the configuration information is to indicate a first part of a TB is to be transmitted in a first hop and a second part of the TB is to be transmitted in a second hop; and receive a physical downlink shared channel (PDSCH) message, or encode a physical uplink shared channel (PUSCH) message for transmission, based on the configuration information.

Example Y18 includes the one or more computer-readable media of example Y17 or some other example herein, wherein the configuration information is included in downlink control information (DCI), or the configuration information is received via: minimum system information (MSI), remaining minimum system information (RMSI), other system information (OSI), or dedicated radio resource control (RRC) signaling.

Example Y19 includes the one or more computer-readable media of example Y17 or some other example herein, wherein the configuration information includes a TB mapping order defined in a time-first and frequency-second manner.

Example Y20 includes the one or more computer-readable media of example Y17 or some other example herein, wherein the configuration information is to indicate that a respective dedicated demodulation reference signal (DMRS) symbol is allocated in each respective hop before transmission of a first TB within the TB group.

Example Y21 includes the one or more computer-readable media of example Y17 or some other example herein, wherein the configuration information is to indicate that one or more TBs are mixed into a common symbol when frequency hopping is applied.

Example Y22 includes the one or more computer-readable media of example Y17 or some other example herein, wherein the configuration information is to indicate a number of symbols for a hopping boundary, or a number of TBs within a TB group for frequency hopping, based on a time domain bundling size for hybrid automatic repeat request-acknowledgement (HARQ-ACK) feedback.

Example Y23 includes the one or more computer-readable media of any of examples Y17-Y24 or some other example herein, wherein the configuration information is to indicate:

for a mixed initial transmission and retransmission in a PDSCH or PUSCH when frequency hopping is enabled: retransmission of TBs is grouped first for frequency hopping, followed by an initial transmission of the TBs on PDSCH or PUSCH; or for uplink control channel (UCI) multiplexed on PUSCH: UCI is equally divided into a first part and a second part, wherein the first part is transmitted in the first hop and the second part is transmitted in the second hop, and wherein retransmitted TBs follow the UCI and initial transmission of the TBs follow retransmitted TBs.

Example Z01 may include an apparatus comprising means to perform one or more elements of a method described in or related to any of examples 1-Y24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-Y24, or any other method or process described herein.

Example Z03 may include an apparatus comprising logic, modules, or circuitry to perform one or more elements of a method described in or related to any of examples 1-Y24, or any other method or process described herein.

Example Z04 may include a method, technique, or process as described in or related to any of examples 1-Y24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-Y24, or portions thereof.

Example Z06 may include a signal as described in or related to any of examples 1-Y24, or portions or parts thereof.

Example Z07 may include a datagram, packet, frame, segment, protocol data unit (PDU), or message as described in or related to any of examples 1-Y24, or portions or parts thereof, or otherwise described in the present disclosure.

Example Z08 may include a signal encoded with data as described in or related to any of examples 1-Y24, or portions or parts thereof, or otherwise described in the present disclosure.

Example Z09 may include a signal encoded with a datagram, packet, frame, segment, protocol data unit (PDU), or message as described in or related to any of examples 1-Y24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-Y24, or portions thereof.

Example Z11 may include a computer program comprising instructions, wherein execution of the program by a processing element is to cause the processing element to carry out the method, techniques, or process as described in or related to any of examples 1-Y24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fourth Generation |
| 5GC | 5G core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |

-continued

| | |
|---|---|
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICHC | Common Pilot Channel |
| CQI | Channel Quality Indicator |
| CPU | CSI processing unit, Central processing unit, |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circut Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Ehanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |

-continued

| | |
|---|---|
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Client Server |
| EESID | Edge Enabler Client Server Identification |
| EHE | Edge Hosting Enviornment |
| EGMF | Exposure Governance Management Function |
| EGPRS | Enhanced GPRS |
| EIR | Equipment Identity Register |
| eLAA | enhanced Licensed Assisted Access, ehanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institue |
| ETWS | Earthquake and Tsunami Warning System |
| eUICC | embedded UICC, embedded Universal Integrated Circut Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/F | Fast Associated Control Channel/Half rate |
| FACH | Foward Access Channel |
| FAUSCH | Fast Uplink Signalling Channel |
| FB | Functional Block |
| FBI | Feeback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiplex Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |

-continued

| | |
|---|---|
| GGSN | Gateway GPRS Support Node |
| GLONASS | GLObal'naya NAvigatsionnay a Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunneling Protocol for User Plane |
| GTS | Go To Sleep Signal (related to WUS) |
| GUMMEI | Globally Unique MME identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Blackhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia Private Identity |
| IMS | IP Multimedia Subsystem |

-continued

| | |
|---|---|
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |

-continued

| | |
|---|---|
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |

-continued

| | |
|---|---|
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence NMIB, N-MIB Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |

-continued

| | |
|---|---|
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |

-continued

| | |
|---|---|
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |

-continued

| | |
|---|---|
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Reference Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |

-continued

| | |
|---|---|
| SCS | Subcarrier Spacing |
| SCTP | Stream Control Transmission Protocol |
| SDAP | Service Data Adaption Protocol, Service Dara Adaption Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Secuirty Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI SS/ PBCH | Block Resource Indicator, Synchronization Signal Block Resource Indicator |
| SSC | Session and Service |
| SS-RSRP | Synchronization Signal based Reference Signal Received |

-continued

| | |
|---|---|
| SS-RSRQ | Synchronization Signal based Reference Signal Received Quality |
| SS-SINR | Synchronization Signal based Reference Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |

-continued

| | |
|---|---|
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

TERMINOLOGY

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:

memory to store configuration information for operation above 52.6 GHz that includes a number of transport blocks (TBs) for frequency hopping for a data transmission associated with a user equipment (UE); and processing circuitry, coupled with the memory, to:

retrieve the configuration information from the memory, wherein the configuration information includes an indication of a TB group containing the TBs, wherein the configuration information is to indicate that the frequency hopping for the data transmission is to be performed within the TB group based on a number of symbols for a hopping boundary, and wherein the configuration information is to indicate a first part of a TB is to be transmitted in a first hop and a second part of the TB is to be transmitted in a second hop based on the number of symbols for the hopping boundary; and encode a message for transmission to the UE that includes the configuration information; and receive a physical uplink shared channel (PUSCH) from the UE, the PUSCH comprises a transmission of the first part of the TB at a first frequency resource for the first hop and a transmission of the second part of the TB at a second frequency resource for the second hop.

2. The apparatus of claim 1, wherein the data transmission associated with the UE is a physical downlink shared channel (PDSCH) transmission, or a physical uplink shared channel (PUSCH) transmission.

3. The apparatus of claim 1, wherein the configuration information in the message is included in downlink control information (DCI), or the message is encoded for transmission via: minimum system information (MSI), remaining minimum system information (RMSI), other system information (OSI), or dedicated radio resource control (RRC) signaling.

4. The apparatus of claim 1, wherein the configuration information includes a TB mapping order defined in a time-first and frequency-second manner.

5. The apparatus of claim 1, wherein the configuration information is to indicate that a respective dedicated demodulation reference signal (DMRS) symbol is allocated in each respective hop before transmission of a first TB within the TB group.

6. The apparatus of claim 1, wherein the configuration information is to indicate that one or more TBs are mixed into a common symbol when frequency hopping is applied.

7. The apparatus of claim 1, wherein the configuration information is to indicate a number of TBs within a TB group for frequency hopping, based on a time domain bundling size for hybrid automatic repeat request-acknowledgement (HARQ-ACK) feedback.

8. The apparatus of claim 1, wherein the configuration information is to indicate:

for a mixed initial transmission and retransmission in a PDSCH or PUSCH, when frequency hopping is enabled:

retransmission of TBs is grouped first for frequency hopping, followed by an initial transmission of the TBs on PDSCH or PUSCH; or for uplink control channel (UCI) multiplexed on PUSCH: UCI is equally divided into a first part and a second part, wherein the first part is transmitted in the first hop and the second part is transmitted in the second hop, and wherein retransmitted TBs follow the UCI and initial transmission of the TBs follow retransmitted TBs.

9. One or more non-transitory computer-readable media storing instructions that, when executed by one or more processors, cause a user equipment (UE) to:

receive a message from a next-generation NodeB (gNB) comprising configuration information for operation above 52.6 GHz that includes a number of transport blocks (TBs) for frequency hopping for a data transmission associated with the UE, wherein the configuration information includes an indication of a TB group containing the TBs, wherein the configuration information is to indicate that the frequency hopping for the data transmission is to be performed within the TB group based on a number of symbols for a hopping boundary, and wherein the configuration information further indicates that a first part of a TB is to be transmitted in a first hop and a second part of the TB is to be transmitted in a second hop based on the number of symbols for the hopping boundary; and transmit a physical uplink shared channel (PUSCH) to the gNB, wherein the PUSCH comprises a transmission of the first part of the TB at a first frequency resource for the first hop and a transmission of the second part of the TB at a second frequency resource for the second hop.

10. The one or more non-transitory computer-readable media of claim 9, wherein the configuration information is included in downlink control information (DCI), or the configuration information is received via: minimum system information (MSI), remaining minimum system information (RMSI), other system information (OSI), or dedicated radio resource control (RRC) signaling.

11. The one or more non-transitory computer-readable media of claim 9, wherein the configuration information includes a TB mapping order defined in a time-first and frequency-second manner.

12. The one or more non-transitory computer-readable media of claim 9, wherein the configuration information is to indicate that a respective dedicated demodulation reference signal (DMRS) symbol is allocated in each respective hop before transmission of a first TB within the TB group.

* * * * *